(12) United States Patent
Nakashin

(10) Patent No.: US 9,383,635 B2
(45) Date of Patent: Jul. 5, 2016

(54) IMAGE PROCESSING DEVICE, PROJECTOR, AND IMAGE PROCESSING METHOD

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 71 days.

(21) Appl. No.: 14/017,795

(22) Filed: Sep. 4, 2013

(65) Prior Publication Data
US 2014/0071409 A1   Mar. 13, 2014

(30) Foreign Application Priority Data

Sep. 11, 2012   (JP) ................. 2012-199332

(51) Int. Cl.
- *G03B 21/14* (2006.01)
- *G03B 21/53* (2006.01)
- *H04N 9/31* (2006.01)
- *G09G 3/00* (2006.01)

(52) U.S. Cl.
CPC ............. *G03B 21/147* (2013.01); *G03B 21/53* (2013.01); *H04N 9/317* (2013.01); *H04N 9/3185* (2013.01); *G09G 3/001* (2013.01)

(58) Field of Classification Search
CPC .......... G03B 21/14; G03B 21/28; G03B 7/03; H04N 9/3194
USPC ................................................. 353/69, 70, 71
See application file for complete search history.

(56) References Cited

U.S. PATENT DOCUMENTS

| | | | |
|---|---|---|---|
| 2010/0026972 A1 | 2/2010 | Kaneko | |
| 2012/0218523 A1* | 8/2012 | Mizuno et al. | 353/69 |
| 2013/0235092 A1 | 9/2013 | Nakashin | |

FOREIGN PATENT DOCUMENTS

| | | |
|---|---|---|
| JP | A-2010-032842 | 2/2010 |
| JP | A-2011-176629 | 9/2011 |
| JP | A-2013-187729 | 9/2013 |

* cited by examiner

*Primary Examiner* — William C Dowling
*Assistant Examiner* — Jerry Brooks
(74) *Attorney, Agent, or Firm* — Oliff PLC

(57) ABSTRACT

An image processing device is capable of suppressing the influence of the direction in which the image is projected on the projection surface to thereby improve the accuracy of the focus adjustment. The image processing device includes a detection section adapted to detect information regarding a direction in which an adjusting image for adjusting focus of an image to be projected on a projection surface is projected on the projection surface, and an adjusting image acquisition section adapted to obtain the adjusting image different in accordance with the information regarding the direction detected by the detection section.

14 Claims, 19 Drawing Sheets

NO YH ≥ 200 → CORRECTION IS NECESSARY
INDEX VALUE A ≤ Yth (=50) → CORRECTION IS NECESSARY
INDEX VALUE A > Yth → CORRECTION IS UNNECESSAR

| GRAYSCALE PATTERN | ADJUSTING IMAGE |
|---|---|
| PATTERN A1, PATTERN B | ADJUSTING IMAGE TP2 |
| PATTERN A2, PATTERN B | ADJUSTING IMAGE TP3 |
| ⋮ | ⋮ |

IMAGE PROCESSING DEVICE, PROJECTOR, AND IMAGE PROCESSING METHOD

The entire disclosure of Japanese Patent Application No. 2012-199332, filed Sep. 11, 2012, is expressly incorporated by reference herein.

BACKGROUND

1. Technical Field

The present invention relates to an image processing device, a projector, and an image processing method.

2. Related Art

In the case of projecting an image on a projection surface such as a screen to thereby display the image using a projector, there are usually performed a focus adjustment for adjusting the shift of the focus of the image (hereinafter also referred to as a "projection image") projected on the projection surface, a keystone correction for correcting the distortion (hereinafter also referred to as a "keystone distortion") of the image range of the projection image, and so on.

As described in, for example, JP-A-2010-32842, the focus adjustment is performed by projecting a patterned image having a stripe shape with white lines and black lines arranged alternately, and varying the focus position of the focusing lens so that the difference in grayscale between the white lines and the black lines of the projection image taken (hereinafter also referred to as a "taken projection image") is enlarged.

In the case of performing the focus adjustment described above, the focus adjustment becomes insufficient in some cases depending on the projection state of the projector at the beginning of the focus adjustment such as the relative positional relationship between the projector and the projection surface, the defocus condition before the focus adjustment, the focus position of the focusing lens before the focus adjustment, and the performance of the image-taking camera. For example, in the case in which the projector fails to be positioned squarely in front of the projection surface, there might be the case in which the white line portion of the taken projection image becomes dark, the case in which the black line portion of the taken projection image becomes bright, the case in which the taken projection image becomes bright in whole, the case in which the taken projection image becomes dark in whole, and so on. In such cases as described above, since the difference in grayscale between the white line portion and the black line portion of the taken projection image before the adjustment is small from the beginning, there arises a problem that even if the focus position of the focusing lens is varied, the variation is also small to make the accurate adjustment difficult, which might cause the insufficient focus adjustment in some cases. Further, the desired focus position might be located out of the adjustable range.

SUMMARY

An advantage of some aspects of the invention is to provide an image processing device, a projector, and an image processing method each capable of suppressing the influence of the direction in which the image is projected on the projection surface to thereby improve the accuracy of the focus adjustment.

An aspect of the invention is directed to an image processing device including a detection section adapted to detect information regarding a direction in which an adjusting image for adjusting focus of an image to be projected on a projection surface is projected on the projection surface, and an adjusting image acquisition section adapted to obtain the adjusting image different in accordance with the information regarding the direction detected by the detection section.

According to this configuration, the adjusting image acquisition section obtains the different adjusting image in accordance with the information regarding the direction. Thus, it is possible for the image processing device to suppress the influence of the direction in which the image is projected on the projection surface to thereby improve the accuracy of the focus adjustment.

Another aspect of the invention is directed to the image processing device according to the above aspect of the invention, wherein the adjusting image acquisition section generates the adjusting image in accordance with the information regarding the direction detected by the detection section.

According to this configuration, the adjusting image acquisition section generates the adjusting image in accordance with the information regarding the direction detected by the detection section. Thus, it is possible for the image processing device to suppress the influence of the direction in which the image is projected on the projection surface to thereby improve the accuracy of the focus adjustment.

Still another aspect of the invention is directed to the image processing device according to the above aspect of the invention, wherein an adjusting image information storage section adapted to store the information regarding the direction and the adjusting images so as to be associated with each other is further included, and the adjusting image acquisition section selects the adjusting image corresponding to the information regarding the direction detected by the detection section out of the adjusting images stored in the adjusting image information storage section.

According to this configuration, the adjusting image acquisition section selects the adjusting image corresponding to the information regarding the direction in which the image is projected on the projection surface out of the adjusting images stored in the adjusting image information storage section. Thus, it is possible for the image processing device to suppress the influence of the direction in which the image is projected on the projection surface to thereby improve the accuracy of the focus adjustment.

Yet another aspect of the invention is directed to the image processing device according to the above aspect of the invention, wherein the detection section images the adjusting image projected on the projection surface, and then detects the information regarding the direction based on at least one of a shape and a grayscale value of a graphic pattern of the adjusting image thus imaged.

Thus, it is possible for the image processing device to reliably suppress the influence of the direction in which the image is projected on the projection surface based on at least one of the shape and the grayscale value of the graphic pattern of the adjusting image to thereby improve the accuracy of the focus adjustment.

Still yet another aspect of the invention is directed to the image processing device according to the above aspect of the invention, wherein the detection section images a bright point projected on the projection surface, and then detects the information regarding the direction based on movement of the bright point thus imaged.

Thus, it is possible for the image processing device to reliably suppress the influence of the direction in which the image is projected on the projection surface based on the bright point projected on the projection surface to thereby improve the accuracy of the focus adjustment.

Further another aspect of the invention is directed to the image processing device according to the above aspect of the invention, wherein the adjusting image information storage section stores the adjusting images each having a shape of a graphic pattern corrected so that the further a position at which an area of the adjusting image is projected is located in accordance with a direction in which the adjusting image is projected, the larger a variation in the area is, so as to be associated with the information regarding the direction.

Thus, it is possible for the image processing device to reliably suppress the influence of the direction in which the image is projected on the projection surface based on the shape of the graphic pattern to thereby improve the accuracy of the focus adjustment.

Still further another aspect of the invention is directed to the image processing device according to the above aspect of the invention, wherein the adjusting image information storage section stores the adjusting images each having a grayscale value of a graphic pattern corrected so that the further a position at which an area of the adjusting image is projected is located in accordance with a direction in which the adjusting image is projected, the larger a variation in the area is, so as to be associated with the information regarding the direction.

Thus, it is possible for the image processing device to reliably suppress the influence of the direction in which the image is projected on the projection surface based on the grayscale value of the graphic pattern to thereby improve the accuracy of the focus adjustment.

Yet further another aspect of the invention is directed to a projector including an image projection optical system adapted to project an image on a projection surface, and the image processing device according to any of the above aspects of the invention.

According to this configuration, the adjusting image acquisition section selects the adjusting image corresponding to the information regarding the direction in which the image is projected on the projection surface out of the adjusting images stored in the adjusting image information storage section. Thus, it is possible for the projector to suppress the influence of the direction in which the image is projected on the projection surface to thereby improve the accuracy of the focus adjustment.

Still yet further another aspect of the invention is directed to a projector including an image projection optical system adapted to project an image on a projection surface, and an image processing device adapted to vary an adjusting image for adjusting focus of the image to be projected on the projection surface in accordance with a direction in which the adjusting image is projected on the projection surface.

Thus, it is possible for the projector to suppress the influence of the direction in which the image is projected on the projection surface to thereby improve the accuracy of the focus adjustment.

A further aspect of the invention is directed to an image processing method in an image processing device adapted to perform image processing on an adjusting image for adjusting focus of an image to be projected on a projection surface, including: detecting, by a detection section, information regarding a direction in which the adjusting image is projected on the projection surface, and obtaining, by an adjusting image acquisition section, the adjusting image different in accordance with the information regarding the direction detected by the detection section.

According to this configuration, the adjusting image acquisition section selects the adjusting image corresponding to the information regarding the direction in which the image is projected on the projection surface out of the adjusting images stored in the adjusting image information storage section. Thus, it is possible for the image processing method to suppress the influence of the direction in which the image is projected on the projection surface to thereby improve the accuracy of the focus adjustment.

According to the aspects of the invention, the adjusting image acquisition section obtains the different adjusting image in accordance with the information regarding the direction in which an image is projected on the projection surface. Thus, it is possible for the image processing device, the projector, and the image processing method to suppress the influence of the direction in which the image is projected on the projection surface to thereby improve the accuracy of the focus adjustment.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Firstly, a configuration of a projector will be explained.

Figure 1:
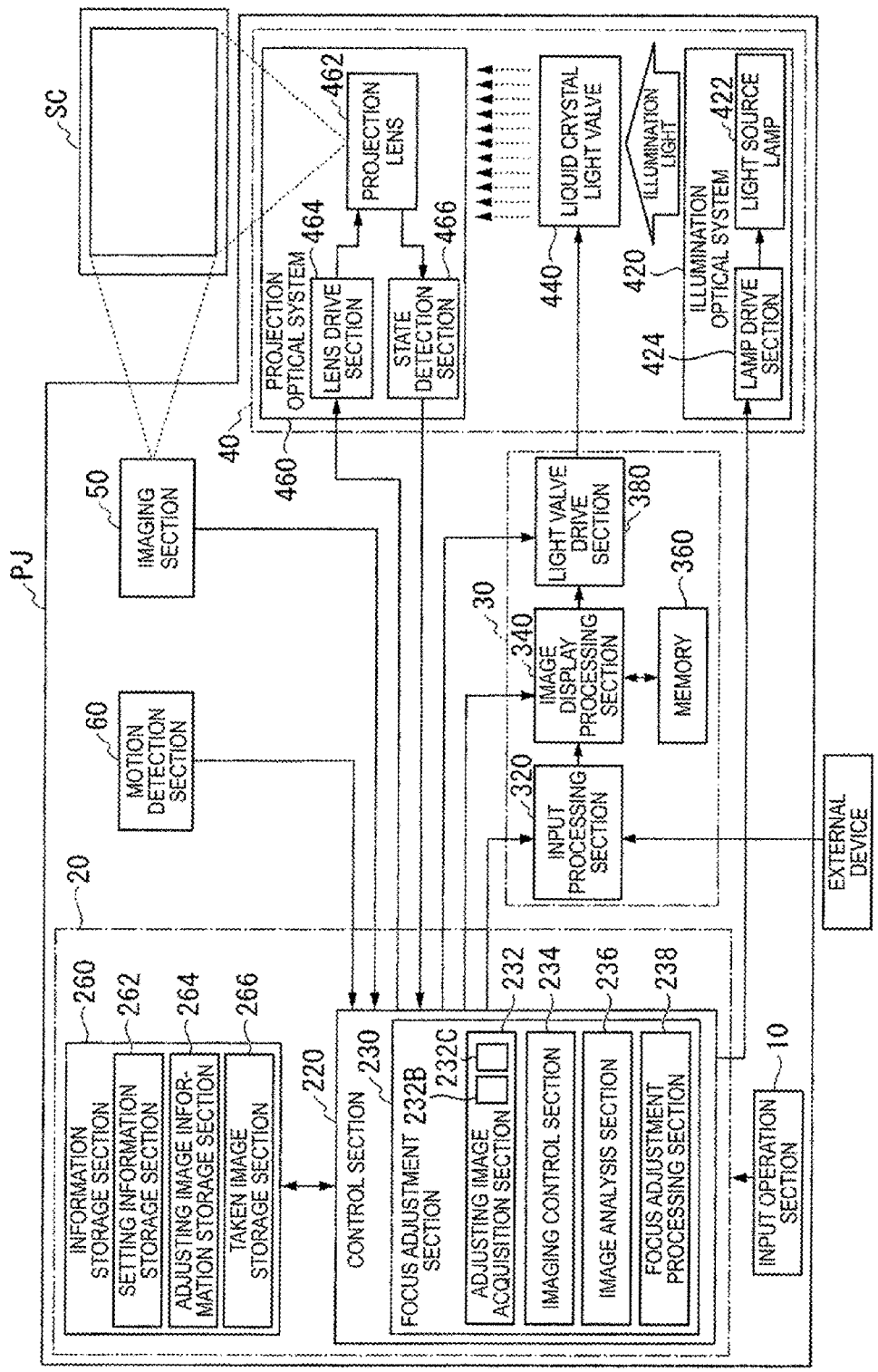
FIG. 1 is a block diagram schematically showing a configuration of a projector according to a first embodiment of the invention.

FIG. 1 is a block diagram schematically showing the configuration of the projector. The projector PJ is provided with an input operation section 10, a control circuit 20, an image processing operation circuit 30, an image projection optical system 40, an imaging section 50, and a motion detection section 60.

The input operation section 10 is composed of, for example, a remote controller, and buttons and keys provided to the projector PJ, wherein the buttons and the keys are not shown in the drawing. The input operation section 10 outputs instruction information corresponding to the operation by the user to the control circuit 20. For example, the instruction information of starting or stopping a focus adjustment process described later is output from the user to the control circuit 20.

The image projection optical system 40 generates image light representing an image, and then images the image light on a screen (a projection surface) SC to thereby project the image in an enlarged manner. The image projection optical system 40 is provided with an illumination optical system 420, a liquid crystal light valve 440, and a projection optical system 460.

The illumination optical system 420 is provided with a light source lamp 422 and a lamp drive section 424. As the light source lamp 422, a variety of types of self-luminescent elements such as a discharge emission light source lamp including, for example, a super-high pressure mercury lamp and a metal halide lamp, a light-emitting diode or an organic electro luminescence (EL) element can be used. The lamp drive section 424 drives the light source lamp 422 based on the control by the control circuit 20.

The liquid crystal light valve 440 is formed of a transmissive liquid crystal panel having a plurality of pixels arranged in a matrix. By controlling the operation of the liquid crystal of each pixel based on a drive signal from a light valve drive section 380 of the image processing operation circuit 30 described later, the liquid crystal light valve 440 converts the illumination light emitted from the illumination optical system 420 into the image light representing the image. It should be noted that in the present embodiment, the liquid crystal light valve 440 includes three liquid crystal light valves (not shown) for respective three color components of red (R), green (G), and blue (B). It should be noted that it is also possible to project a monochrome image using a single liquid crystal light valve.

The projection optical system 460 images the image light emitted from the liquid crystal light valve 440 on the screen SC to thereby project the image on the screen SC in an enlarged manner. The projection optical system 460 is provided with a projection lens 462, a lens drive section 464, and a state detection section 466. The projection lens 462 has a focusing lens for the focus adjustment and a zoom lens for the zoom adjustment, which are not shown in the drawing, and are configured so as to move in the optical axis direction, and enlarges the image light emitted from the liquid crystal light valve 440 in accordance with the zoom position of the zoom lens, and then images the image light in accordance with the focus position of the focusing lens to thereby project the image represented by the image light on the screen SC in an enlarged manner. The lens drive section 464 changes the position (hereinafter referred to as a "focus position") in the optical axis direction of the focusing lens based on the control by the control circuit 20. Further, the lens drive section 464 changes the position (hereinafter referred to as a "zoom position") in the optical axis direction of the zoom lens. The state detection section 466 detects the focus position of the focusing lens and the zoom position of the zoom lens. It should be noted that since the projection optical system 460 has a typical configuration, the graphical description and the explanation of the specific configuration will be omitted.

The image processing operation circuit 30 is provided with an input processing section 320, an image display processing section 340, a memory 360, and the light valve drive section 380. Based on the control by the control circuit 20, the input processing section 320 performs A/D conversion on an input image signal supplied from the external device, if necessary, to thereby convert it into a digital image signal, which can be processed by the image display processing section 340. Based on the control by the control circuit 20, the image display processing section 340 writes the digital image signal, which is output from the input processing section 320, into the memory 360 frame by frame, and then performs various image processing such as a resolution conversion process or a keystone correction process when reading out the digital image signal therefrom. The light valve drive section 380 drives the liquid crystal light valve 440 with the digital image signal input from the image display processing section 340. It is also possible to arrange that the light valve drive section 380 is provided to the image projection optical system 40, but not to the image processing operation circuit 30.

Based on the control by the control circuit 20, the imaging section 50 takes the adjusting image as the projection image projected on the screen SC in an enlarged manner, and then outputs the image signal corresponding to the adjusting image thus taken to the control circuit 20. The imaging section 50 is configured using, for example, a CCD camera provided with a charge coupled device (CCD) as an imaging element. It should be noted that the adjusting image will be described later.

The motion detection section 60 detects a motion around the projection axis, a motion in a vertical direction, a motion in a horizontal direction, and stoppage of the motions in the projector PJ. It should be noted that the motion detection section can be configured using a variety of sensors capable of detecting the motions and the stoppage of the motions, such as an angular velocity sensor, an acceleration sensor, or a gyro sensor.

The control circuit 20 is a computer provided with a central processing unit (CPU), a read only memory (ROM), a random access memory (RAM), and so on, and constitutes a control section 220 and an information storage section 260 by executing a control program. The control section 220 functions as a variety of control function sections for respectively controlling the image processing operation circuit 30, the image projection optical system 40, the imaging section 50, and the motion detection section 60 with the control program thus executed. The information storage section 260 functions as a variety of storage sections for storing the information for the respective control operations. FIG. 1 shows a focus adjustment section 230 for controlling the focus adjustment described later as an example of the control function sections of the control section 220. The focus adjustment section 230 operates by executing the corresponding program in response to the user instructing to start the focus adjustment from the input operation section 10. Further, as examples of the storage sections of the information storage section 260, FIG. 1 shows a setting information storage section 262 for storing setting information used for various control operations by the control section 220, an adjusting image information storage section 264 for storing adjusting image information described later, and a taken image storage section 266 for storing the image data of the taken image taken by the imaging section 50.

The focus adjustment section 230 is provided with an adjusting image acquisition section 232, an imaging control section 234, an image analysis section 236, and a focus adjustment processing section 238. The adjusting image acquisition section 232 obtains the image data of the adjusting image for the focus adjustment. The adjusting image acquisition section 232 includes an adjusting image generation section 232B and an adjusting image selection section 232C. The adjusting image generation section 232B generates the image data of the adjusting image for the focus adjustment. Further, the adjusting image selection section 232C selects the adjusting image out of the plurality of adjusting images stored in the adjusting image information storage section 264. The details of the adjusting image generation section 232B and the adjusting image selection section 232C will be described later. The imaging control section 234 controls the imaging section 50 to take the adjusting image projected on the screen SC, and then stores the adjusting image into the adjusting image storage section 266. The image analysis section 236 analyzes the adjusting image thus taken. It should be noted that the image analysis section 236 can be disposed in the adjusting image acquisition section 232. The focus adjustment processing section 238 controls the state detection section 466 and the lens drive section 464 to perform the focus adjustment. The focus adjustment section 230 will further be described later.

Then, the action of the focus adjustment of the projector will be explained.

Figure 2:
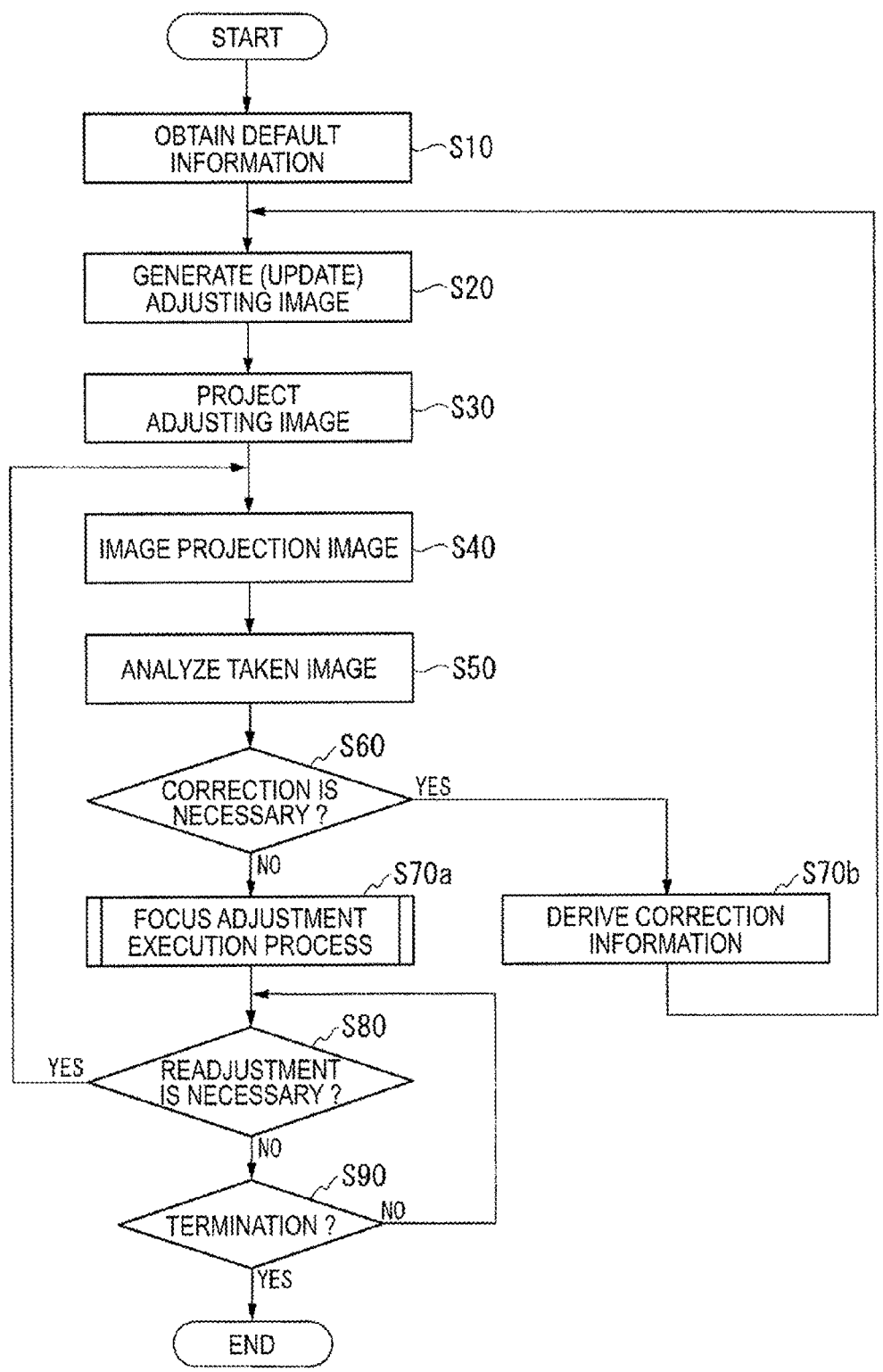
FIG. 2 is a flowchart showing an example of a flow of a focus adjustment process in the first embodiment of the invention.

FIG. 2 is a flowchart showing an example of the flow of the focus adjustment process. When the focus adjustment section 230 (FIG. 1) of the control section 220 starts the focus adjustment process, the adjusting image acquisition section 232 of the focus adjustment section 230 obtains (step S10) the default information as the adjusting image information for generating the adjusting image for first displaying by projection in order to perform the focus adjustment.

Figure 3:
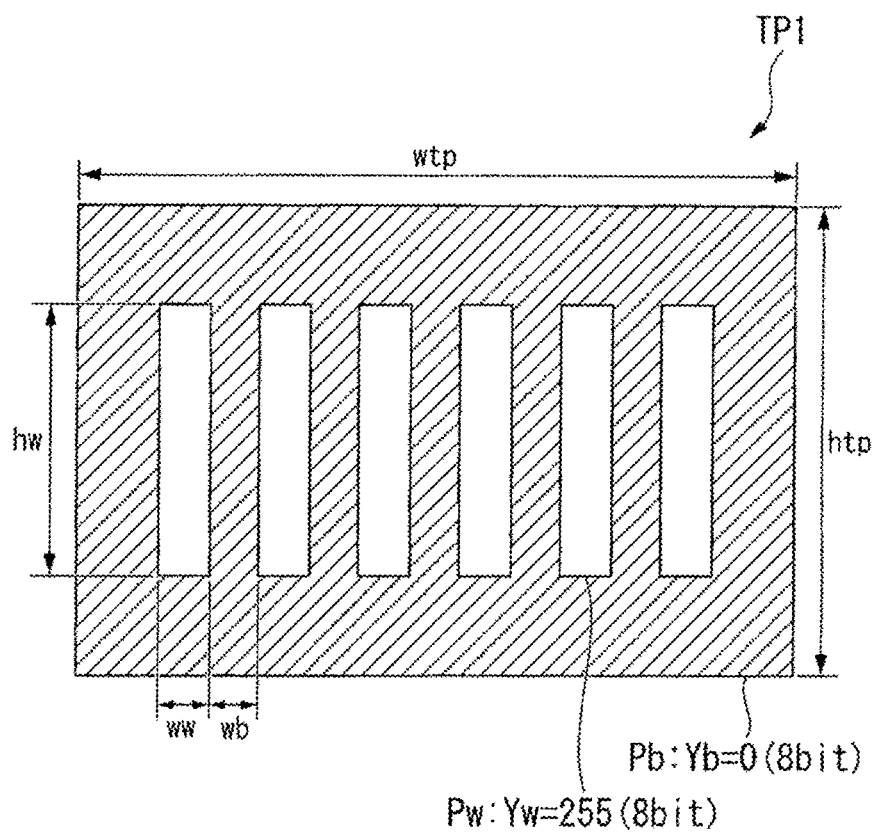
FIG. 3 is a diagram showing a first example of an adjusting image used for the focus adjustment in the first embodiment of the invention.

FIG. 3 shows a diagram for explaining the adjusting image used for the focus adjustment. The adjusting image TP1 is a stripe pattern image having a plurality of (six in the example of the drawing) white images Pw (the grayscale value Yw of the luminance: 255 (8 bits)) each having a rectangular shape arranged in a lateral direction with intervals on a black background image Pb (the grayscale value Yb of the luminance: 0 (8 bits)) having a rectangular shape. It should be noted that in FIG. 3, the width of the black background Pb is denoted with "wtp," and the height is denoted with "htp." Further, the width of the white image Pw is denoted with "ww" (<wtp), the height is denoted with "hw" (≤htp), and each of the intervals is denoted with "wb." Further, the width wtp, the height htp, and the grayscale value Yb of the black background image Pb of the default adjusting image, and the width ww, the height hw, and the grayscale value Yw of each of the white images Pw are stored in the adjusting image information storage section 264 (FIG. 1) as the default information. Therefore, the adjusting image acquisition section 232 refers to the adjusting image information storage section 264 to obtain the default information of the adjusting image information. It should be noted that since each of the grayscale value Yw of each of the white images Pw and the grayscale value Yb of the black background image Pb is normally a constant value determined in advance, and can therefore be eliminated. It should be noted that the grayscale value can be expressed in other bit width (e.g., 10-bit width) than 8-bit width.

Then, the adjusting image acquisition section 232 generates the adjusting image based on the default information of the adjusting image information thus obtained, and then outputs the image data (hereinafter also referred to as "adjusting image data") of the adjusting image thus generated to the image display processing section 340 (FIG. 1) of the image processing operation circuit 30. Further, in the case of deriving correction information (described later) in the step S70*b* (described later), the adjusting image acquisition section 232 updates the adjusting image data based on the correction information thus derived.

Here, the adjusting image acquisition section 232 obtains the information representing the projection size of the taken projection image CTPn (the symbol "n" is an integer equal to or greater than 1), the information representing the projection distance, the information representing the light intensity of the environmental light, and the information representing the color of the screen SC as parameter values for updating the adjusting image data via the input operation section 10. For example the adjusting image acquisition section 232 can update the color of the taken projection image CTPn based on the information representing the color of the screen SC.

It should be noted that the adjusting image acquisition section 232 can obtain these parameter values based on the taken projection image CTPn taken by the imaging section 50 via the image analysis section 236. For example the adjusting image acquisition section 232 can update (step S20) the projection size of the taken projection image CTPn in accordance with the resolution of the imaging section 50.

The adjusting image TPn represented by the adjusting image data output to the image display processing section 340 is displayed by projection on the screen SC (step S30) while keeping the various setting such as the focus position and the zoom position in the setting in the present stage with the image display processing section 340, the light valve drive section 380, and the image projection optical system 40 (FIG. 1) controlled by the focus adjustment section 230.

Then, the imaging control section 234 (FIG. 1) of the focus adjustment section 230 controls the imaging section 50 to take the adjusting image as the projection image displayed by projection on the screen SC, and the image data (also referred to as "taken image data" or "taken adjusting image data") of the image (also referred to as a "taken image" or a "taken adjusting image") thus taken is obtained, and then stored into the taken image storage section 266 (step S40).

Then, the image analysis section 236 (FIG. 1) of the focus adjustment section 230 performs (step S50) the analysis of the taken image as explained below, and then determines (step S60) the necessity of the correction of the adjusting image displayed by projection.

Figure 4A:
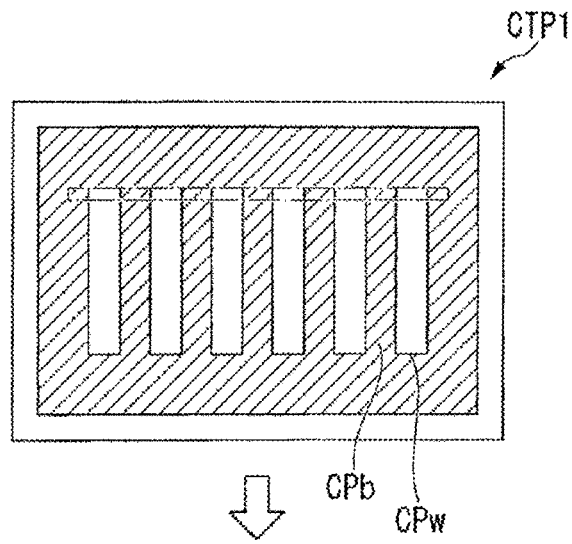
FIGS. 4A and 4B are explanatory diagrams showing an analysis of the taken image and a determination on the necessity of a correction of an adjusting image performed by an image analysis section in the first embodiment of the invention.
Figure 4B:
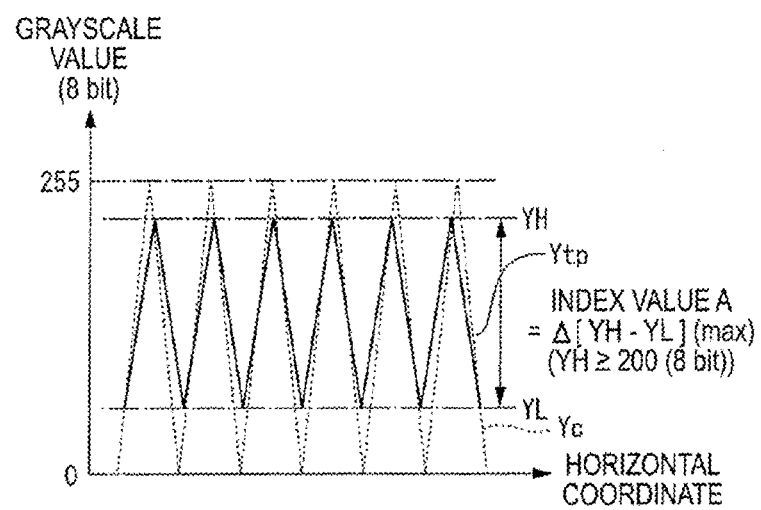

FIGS. 4A and 4B are explanatory diagrams showing the analysis of the taken image and the determination on the necessity of the correction of the adjusting image performed by the image analysis section. FIG. 4A is a schematic diagram showing the taken adjusting image CTP1 obtained. FIG. 4B shows the analysis result of the taken adjusting image CTP1 and the determination on the necessity of the correction.

As shown in FIG. 4A, the image data of the stripe image corresponding to the single line indicated by the frame of the dashed-dotted line is readout from the taken adjusting image data stored in the taken image storage section 266. Here, the range slightly larger than the range of the stripe image is read out instead of the range from end to end of the stripe image. FIG. 4B shows the state (hereinafter also referred to as a "gray-scale pattern") of the variation in the gray-scale value of the image data thus read out. The grayscale pattern Yc indicated by the dotted line in FIG. 4B schematically shows the state of the grayscale variation to be theoretically obtained in the case of ignoring various losses and so on in the case of reading out the stripe image corresponding to the single line. It should be noted that hereinafter the gray-scale pattern Yc is also referred to as an "ideal gray-scale pattern" or a "theoretical gray-scale pattern." However, as indicated by the solid line in FIG. 43, the grayscale pattern Ytp actually read out is shifted from the ideal grayscale pattern Yc in accordance with the projection conditions such as the state of the defocus, the zoom state, the resolution of the imaging section 50, the projection distance, the environmental light, and the state (e.g., the color and material) of the screen. For example, the grayscale value YH of the part (hereinafter also referred to as a "taken white image") CPw obtained by imaging the white image Pw, and the grayscale value YL of the part (hereinafter also referred to as a "taken interval black image") CPb corresponding to the black background image Pb between the taken white images CPw take the values shifted from the ideal state.

Therefore, the grayscale values YH of the taken white images CPw and the grayscale values YL of the taken interval black images CPb are sequentially read out from the left end, and then the differences Δ[YH−YL] between the grayscales YH, YL are obtained. Then, the maximum value Δ[YH−YL] (max) of the differences Δ[YH−YL] is taken as an index value A representing a degree of correctness of the focus adjustment described later. It should be noted that the grayscale values to be the object obtained as the difference are only in the case in which the grayscale values YH of the taken white images CPw fulfill YH≥200 (in 8 bits).

Further, in the case in which no grayscale value YH of the taken white image CPw thus read out fulfills YH≥200, it is determined that the correction of the adjusting image is necessary. This is because, it is conceivable that in the case in which the grayscale YH of the taken white image CPw fulfills YH<200 while the grayscale value Yw of the original white image Pw fulfills Yw=255 (in 8 bits), the accuracy of the difference thus obtained degrades to make the accurate analysis difficult. It should be noted that the limitation of the grayscale value YH is not limited to YH≥200, but is the value which can arbitrarily be changed in accordance with the projection conditions, and YH≥160 through about 196 can also be adopted.

Further, in the case in which the threshold value Yth of the index value A is set to Yth=50 (in 8 bits), and A≤Yth is true, it is determined that the correction of the adjusting image is necessary. This is because, it is conceivable that as explained in the related art example, in the case in which the difference Δ[YH−YL] fails to be equal to or higher than about 50, there is a high probability of causing the problem that, for example, even if the focus position of the focus lens is varied, the variation amount is also reduced to make the accurate adjustment difficult. In contrast, in the case in which A>Yth is true, it is determined that the correction is unnecessary (the correction is not necessary). It should be noted that the value of the threshold value Yth is not limited to this value, but is a value which can arbitrarily be changed in accordance with the projection conditions, the accuracy required for the focus adjustment, and so on. Although the higher the threshold value Yth is, the higher the accuracy of the focus adjustment becomes, ideally, it becomes difficult to generate the adjusting image so as to fulfill A>Yth, and thus, the possibility of determining that the correction is necessary rises unnecessarily. Therefore, the threshold value Yth is set taking these conditions into consideration.

Then, if it is determined that the correction of the adjusting image is unnecessary (the correction is not necessary) (NO in the step S60), the focus adjustment processing section 238 (FIG. 1) of the focus adjustment section 230 performs (step S70a) the focus adjustment execution process. The focus adjustment execution process is performed using a variety of general methods. In a brief exemplification, for example, an integrated value obtained by sequentially accumulating the differences (also referred to as "grayscale value differences" or "contrast values") between the grayscale value YH of the white image area and the grayscale value YL of the black image area adjacent to each other in the stripe pattern of the adjusting image thus taken while changing the focus position of the focus lens can be obtained. Then, by taking the position where the integrated value thus obtained reaches a local maximum as the focus position where the focus is achieved, the focus adjustment is performed. Further, it is also possible to arrange that the focus adjustment is performed by obtaining the focus position where the integrated value reaches the maximum value. Further, it is also possible to arrange that the focus adjustment is performed by taking the integrated value with which the focus is achieved as a reference integrated value, and the focus position is adjusted so that the integrated value obtained becomes equal to the reference integrated value.

In contrast, if it is determined that the correction of the adjusting image is necessary (YES in the step S60), the adjusting image acquisition section 232 derives (step S70b) the correction information of the adjusting image. Then, going back to the step S20, the adjusting image acquisition section 232 updates the adjusting image based on the correction information thus derived, then the image data of the adjusting image thus updated is output to the image display processing section 340, and then the process of the steps S20 through S70b is repeated until it is determined in the step S60 that the correction of the adjusting image is unnecessary. It should be noted that the derivation of the correction information will further be described later.

In the case in which the focus adjustment process is performed (step S70a), the determination (step S80) whether or not the re-execution of the focus adjustment process is necessary and the determination (step S90) on the termination of the focus adjustment are performed. In the case in which the termination of the focus adjustment is instructed by the user from the input operation section 10, the termination of the focus adjustment is terminated (YES in the step S90), and the series of focus adjustment process is terminated. In contrast, in the period in which the termination of the focus adjustment is not determined (NO in the step S90), and the re-execution of the focus adjustment process is not determined to be necessary (NO in the step S80), the process keeps the present state. Further, in the case in which it is determined that the re-execution of the focus adjustment process is necessary (YES in the step S80), the process returns to the step S40, and then the imaging of the adjusting image as the projection image, the image analysis in the step S50, and the determination on the necessity of the correction of the adjusting image in the step S60 are performed, and then the focus adjustment execution process in the step S70a or the correction information derivation process in the step S70b is performed again in accordance with the determination on the necessity of the correction.

Then, the derivation of the correction information will be explained.

The adjusting image generation section 232B generates the adjusting image TPn in accordance with the information regarding the direction in which the adjusting image is projected on the screen SC detected by the imaging section 50 and the image analysis section 236. For example, by performing the calculation based on the arithmetic expression (the correction information) using the information regarding the direction as the parameter on a predetermined default adjusting image TP1, the adjusting image generation section 232B generates the adjusting image TPn having the graphic pattern of the adjusting image TP1 modified to have a trapezoidal shape, and the grayscale of the adjusting image TP1 regulated. Here, the arithmetic expression can also be derived based on the positional relationship between the screen SC and the projector PJ so that the further the position at which the area of the adjusting image TP1 is projected is, the larger variation the shape of the graphic pattern is corrected with, in accordance with the direction in which the adjusting image TP1 is projected. Further, the arithmetic expression can also be derived based on the positional relationship between the screen SC and the projector PJ so that the further the position at which the area of the adjusting image TP1 is projected is, the larger variation the grayscale of the graphic pattern is corrected with, in accordance with the direction in which the adjusting image TP1 is projected. It should be noted that the arithmetic expression can be a formula provided to the adjusting image generation section 232B.

The derivation of the correction information can also be performed as follows.

The adjusting image selection section 232C selects the adjusting image TPn corresponding to the information regarding the direction in which the adjusting image is projected on the screen SC detected by the imaging section 50 and the image analysis section 236 out of the adjusting images TPn stored in the adjusting image information storage section 264.

Figure 5:
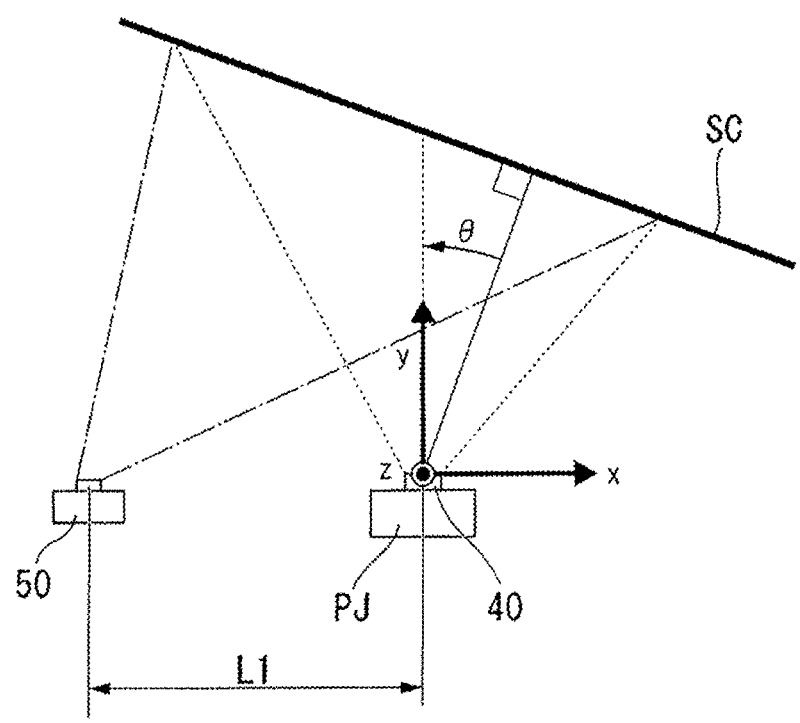
FIG. 5 is a diagram showing a first example (Case 1) of the positional relationship between an image projection optical system, a screen, and an imaging section in the first embodiment of the invention.

FIG. 5 shows a first example (hereinafter referred to as "Case 1") of the positional relationship between the image projection optical system, the screen, and the imaging section. In FIG. 5, the xyz coordinate system is defined taking the image projection optical system 40 of the projector PJ as the origin. Here, the y axis is defined to have a direction toward the front of the projector PJ, and forms a horizontal tilt angle θ (e.g., 15 [degrees]) with respect to the normal line of the screen SC. In other words, the projector PJ is disposed so as to have the horizontal tilt angle θ with respect to the screen SC. Further, the x axis is defined to have a horizontally rightward direction forming a right angle with the y axis. Further, the z axis is defined to have an upward direction forming a right angle with each of the x axis and the y axis.

In FIG. 5, the imaging section 50 is disposed at a position by a distance L1 distant from the image projection optical system 40 in the negative direction of the x axis, for example. The imaging section 50 detects the information (e.g., the grayscale pattern) regarding the direction in which the adjusting image is projected on the screen SC. Here, the imaging section 50 images the adjusting image TP1 (see FIG. 3) projected on the screen SC, and then detects the information regarding the direction in which the adjusting image is projected on the screen SC based on at least one of the shape and the grayscale value (e.g., the luminance) of the graphic pattern of the adjusting image thus imaged.

Figure 6:
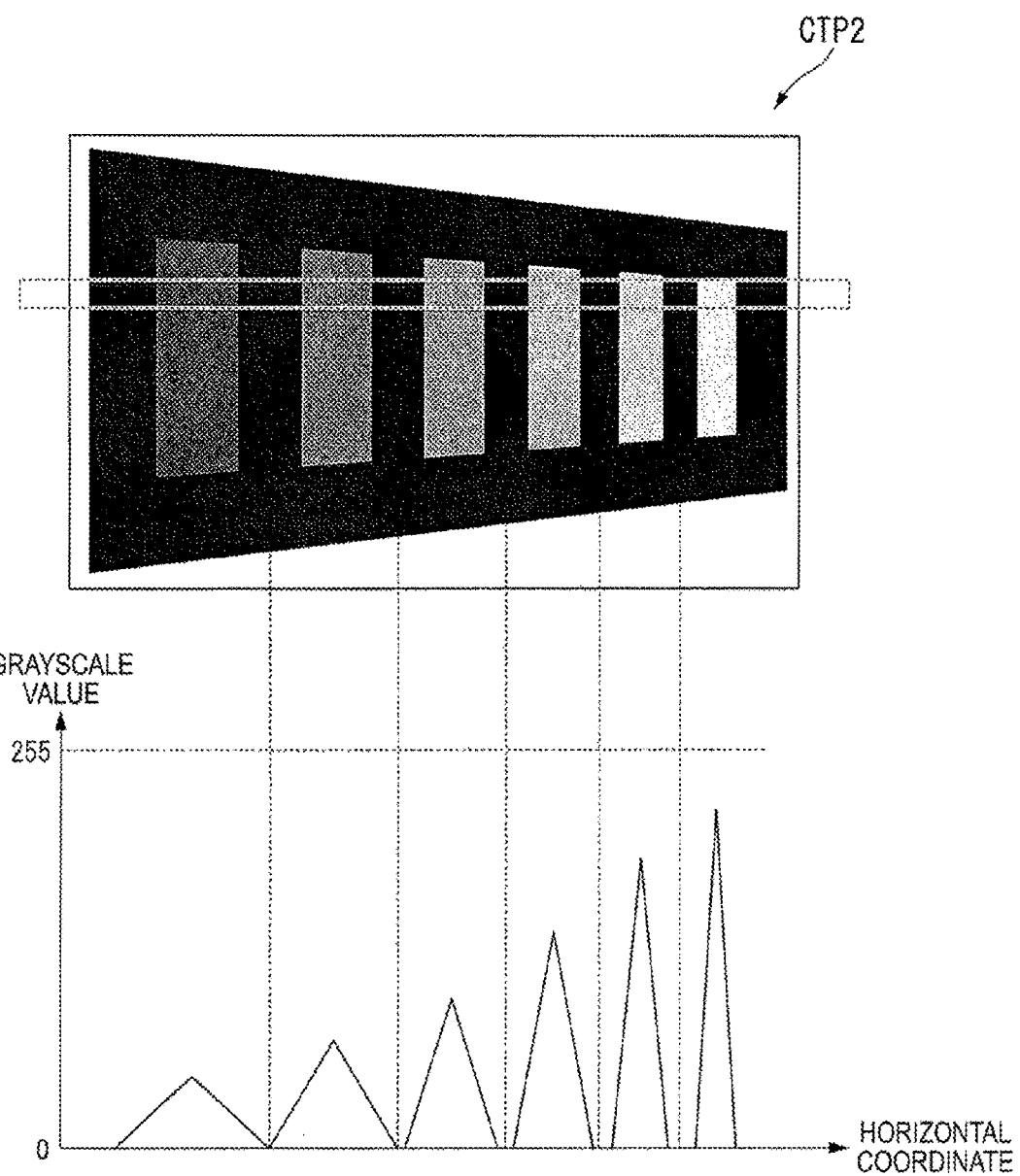
FIG. 6 is a diagram showing an example of an imaging adjusting image and a grayscale pattern regarding Case 1 in the first embodiment of the invention.

FIG. 6 shows an example (a taken adjusting image CTP2) of the taken adjusting image and the grayscale pattern with respect to Case 1. In the upper part of FIG. 6, there is shown the taken adjusting image CTP2. On the other hand, in the lower part of FIG. 6, there is shown a grayscale pattern corresponding to the graphic pattern of the taken adjusting image CTP2. Since the projector PJ is disposed so as to realize the tilt angle θ, the taken adjusting image CTP2 is transformed so that the further the position at which an area of the adjusting image TP1 is projected is located from the projector PJ in the direction (in the tilt direction of the projector PJ) in which the adjusting image is projected (the closer to the left end the area is located in FIG. 6), the larger the width, the height, and the distance of the figure in the area become, to thereby have a trapezoidal shape, and the more the contour of the figure in the area is indistinct. In this case, in the grayscale pattern, the smaller the value of the horizontal coordinate is, the larger the width and the interval of the peaks of the grayscale value (the luminance) become. Hereinafter, the pattern is referred to as "pattern A1." It should be noted that, in the grayscale pattern, the pattern in which the smaller the value of the horizontal coordinate is, the slightly larger (not larger than a predetermined value) the width and the interval of the peaks of the grayscale value (the luminance) become is hereinafter referred to as "pattern A2."

Further, in the taken adjusting image CTP2, the further the position at which an area of the adjusting image TP1 is projected is located from the projector PJ in the direction in which the adjusting image is projected, the lower the grayscale value in the area becomes. In this case, in the grayscale pattern, the smaller the value of the horizontal coordinate is, the lower the height of the peak of the grayscale value (the luminance) becomes. Hereinafter, this pattern is referred to as "pattern B."

Figures 7, 8:
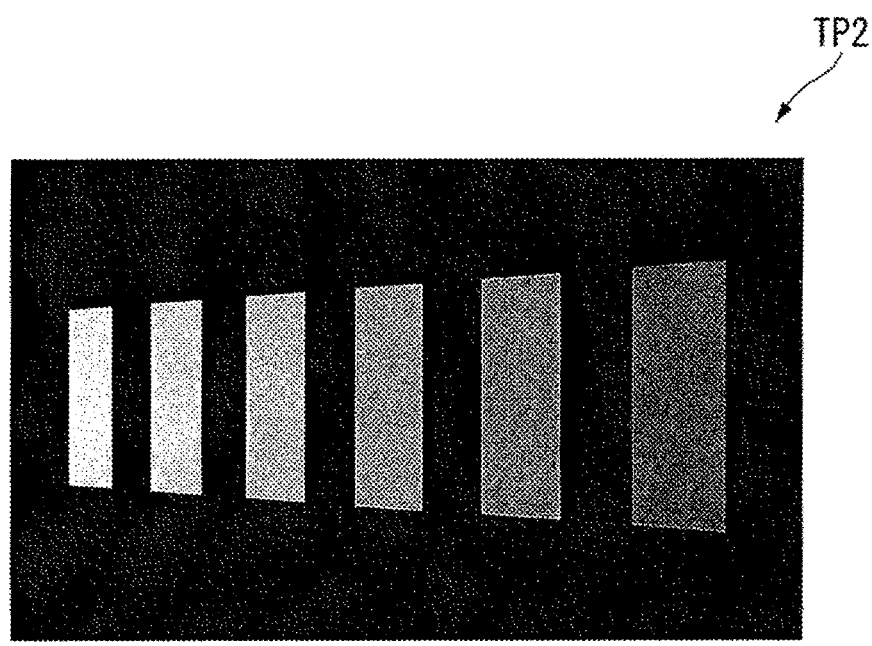
FIG. 7 is a table showing an example of the correspondence between the grayscale pattern and the adjusting image in the first embodiment of the invention.
FIG. 8 is a diagram showing an example of the adjusting image selected regarding Case 1 in the first embodiment of the invention.

FIG. 7 shows an example of the correspondence between the grayscale pattern and the adjusting image using a table. The adjusting image information storage section 264 (see FIG. 1) stores the information regarding the direction in which the adjusting image is projected on the screen SC and the adjusting image TPn associated with each other as the correction information. Here, the information regarding the direction in which the adjusting image is projected on the screen SC denotes the grayscale pattern varying in accordance with the tilt direction of the projector PJ.

The adjusting image information storage section 264 stores the adjusting image TPn, the shape of the graphic pattern of which is corrected so that the further the position at which an area of the adjusting image is projected is located from the projector PJ in the direction in which the adjusting image is projected, the larger the variation in the area is, so as to be associated with the information (the grayscale pattern) regarding the direction in which the adjusting image is projected on the screen SC. Further, the adjusting image information storage section 264 stores the adjusting image TPn, the grayscale value (e.g., the luminance) of the graphic pattern of which is corrected so that the further the position at which an area of the adjusting image is projected is located from the projector PJ in the direction in which the adjusting image is projected, the larger the variation in the area is, so as to be associated with the information (the grayscale pattern) regarding the direction in which the adjusting image is projected on the screen SC.

In FIG. 7, the taken projection image CTP1 (see FIG. 4A) has the grayscale pattern corresponding to the pattern A1 and the pattern B (see FIG. 6), and is therefore associated with the adjusting image TP2. Further, the taken projection image CTP2 has the grayscale pattern corresponding to the pattern A2 and the pattern B (described later using FIG. 11), and is therefore associated with the adjusting image TP3 (described later using FIG. 12).

The adjusting image selection section 232C (see FIG. 1) selects the adjusting image TP2 corresponding to the grayscale patterns A1 and B (see FIG. 6) of the taken projection image CTP2 out of the adjusting images TP1 through TPm (the symbol m represents an integer equal to or greater than n) stored in the adjusting image information storage section 264.

FIG. 8 shows an example (the adjusting image TP2) of the adjusting image selected with respect to Case 1. The adjusting image TP2 is corrected in the shape of the graphic pattern so that the further the position at which an area of the adjusting image TP2 is projected is located from the projector PJ in accordance with the direction in which the adjusting image is projected, the larger the variation in the area is. Specifically, in the adjusting image TP2, the further the position at which an area of the adjusting image TP2 is projected is located from the projector PJ in the direction in which the adjusting image is projected (the closer to the left end the area is located in FIG. 8), the smaller the width, the height, and the distance of the figure in the area become, and the degree of the transformation into the trapezoid is also weak. Further, in the adjusting image TP2, the further the position at which an area of the adjusting image TP2 is projected is located from the projector PJ in the direction in which the adjusting image is projected (the closer to the left end the area is located in FIG. 8), the higher the grayscale value in the area becomes.

Figure 9:
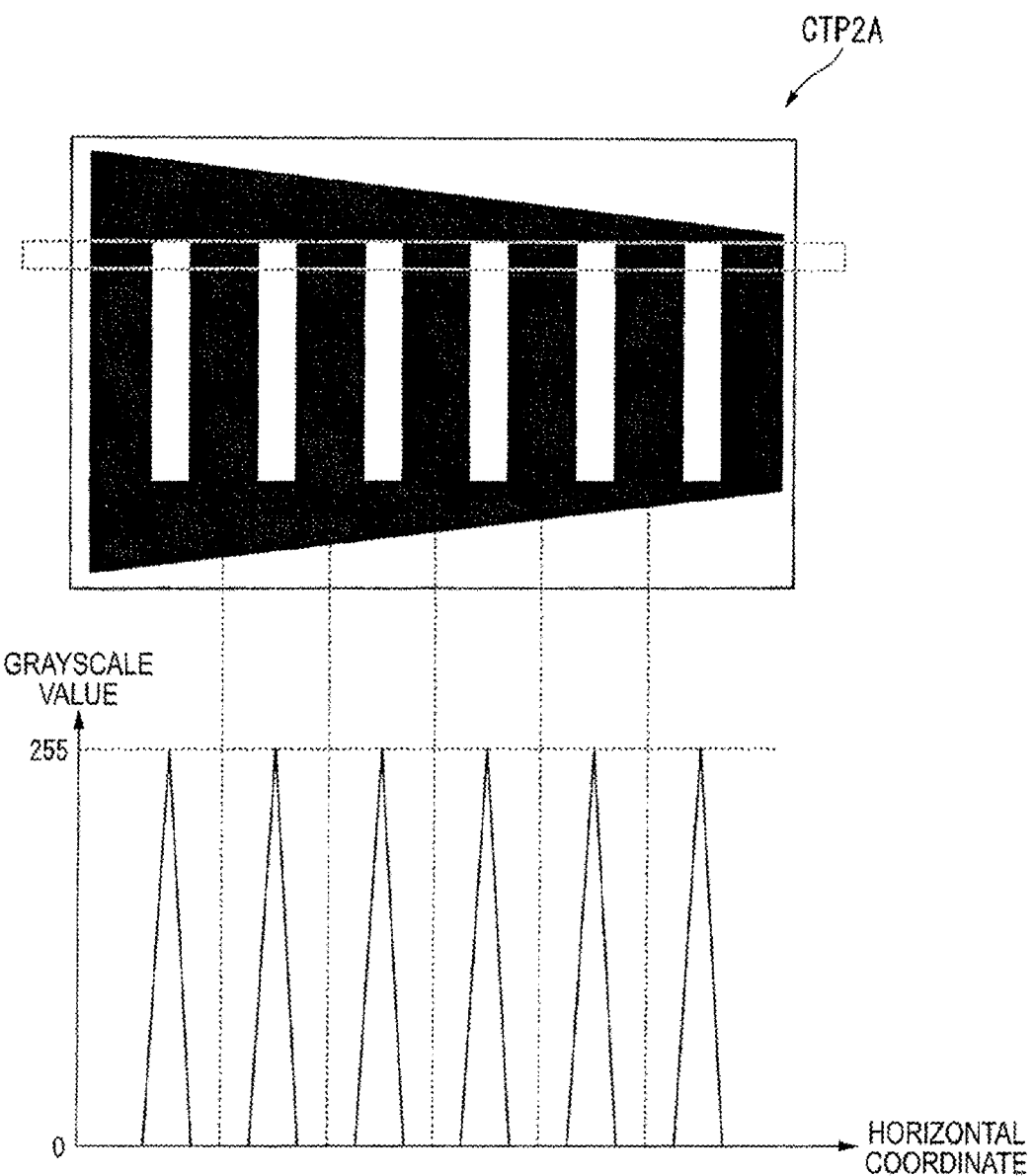
FIG. 9 is a diagram showing an example of the imaging adjusting image and the grayscale pattern regarding Case 1 according to the first embodiment of the invention.

FIG. 9 shows an example (a taken adjusting image CTP2A) of the taken adjusting image and the grayscale pattern (an ideal grayscale pattern) with respect to Case 1. The adjusting image selection section 232C (see FIG. 1) outputs the image data of the adjusting image TP2 as the adjusting image updated based on the correction information derived by the adjusting image acquisition section 232 to the image display processing section 340. Thus, the adjusting image TP2 is projected on the screen SC. The taken adjusting image CTP2A is the taken adjusting image taken by the imaging section 50 on this occasion.

It should be noted that the light intensity of the light source lamp 422 (see FIG. 1) can also be adjusted so that the grayscale value of the rectangular white image of the taken adjusting image CTP2A takes the maximum value of 255 (see the lower part of FIG. 9).

Figure 10:
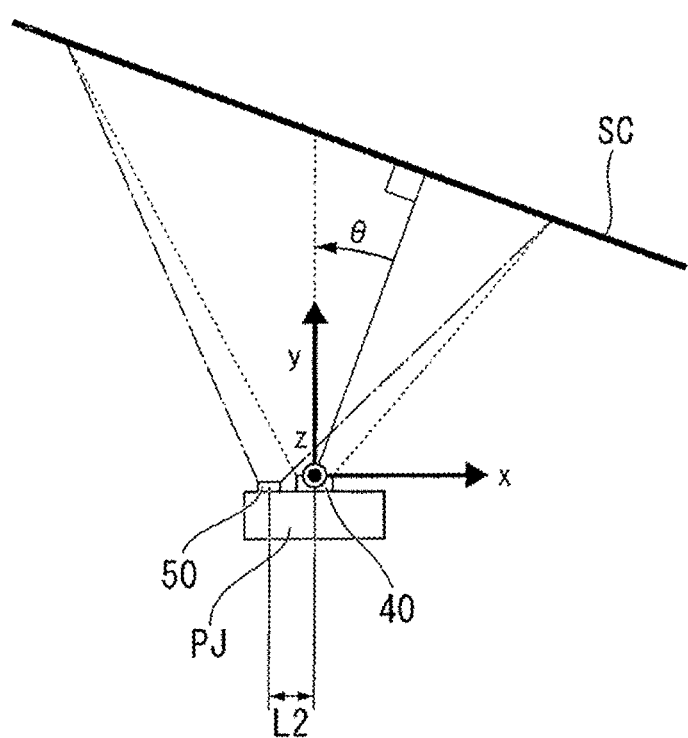
FIG. 10 is a diagram showing a second example (Case 2) of the positional relationship between the image projection optical system, the screen, and the imaging section in the first embodiment of the invention.

FIG. 10 shows a second example (hereinafter referred to as "Case 2") of the positional relationship between the image projection optical system, the screen, and the imaging section. In FIG. 10, the imaging section 50 is disposed at a position by a distance L2 distant from the image projection optical system 40 in the negative direction of the x axis, for example, wherein the distance L2 is shorter than the distance L1 (see FIG. 5). The imaging section 50 detects the information (e.g., the grayscale pattern) regarding the direction in which the adjusting image is projected on the screen SC. Here, the imaging section 50 images the adjusting image TP1 (see FIG. 3) projected on the screen SC, and then detects the information regarding the direction in which the adjusting image is projected on the screen SC based on the shape and the grayscale value (e.g., the luminance) of the graphic pattern of the adjusting image thus imaged.

Figure 11:
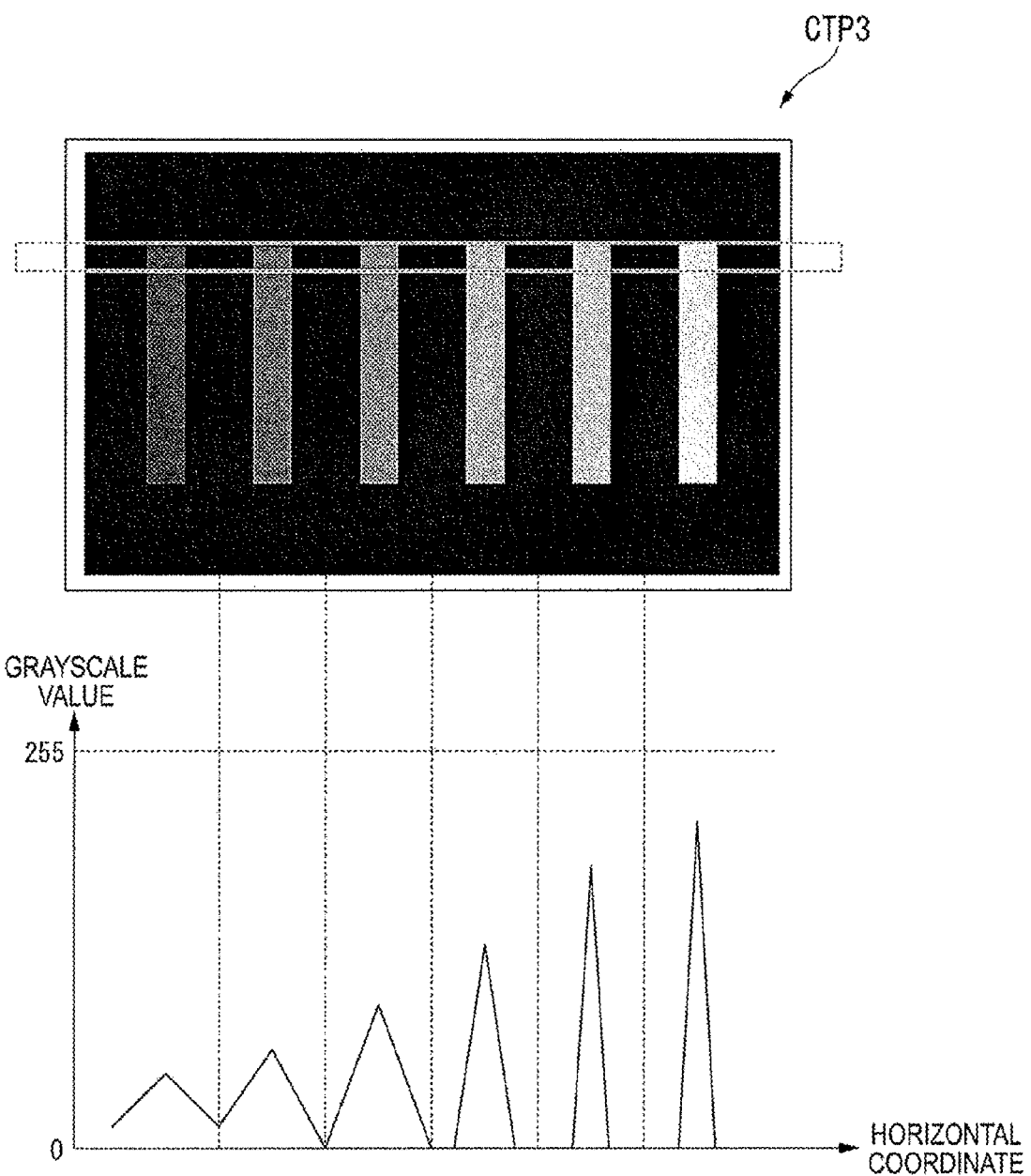
FIG. 11 is a diagram showing an example of the imaging adjusting image and the grayscale pattern regarding Case 2 according to the first embodiment of the invention.

FIG. 11 shows an example (a taken adjusting image CTP3) of the taken adjusting image and the grayscale pattern with respect to Case 2. In the upper part of FIG. 11, there is shown the taken adjusting image CTP3. On the other hand, in the lower part of FIG. 11, there is shown a grayscale pattern corresponding to the graphic pattern of the taken adjusting image CTP3. Since the projector PJ is disposed so as to realize the tilt angle θ, the taken adjusting image CTP3 is transformed so that the further the position at which an area of the adjusting image is projected is located from the projector PJ in the direction in which the adjusting image is projected (the closer to the left end the area is located in FIG. 11), the slightly larger the width, the height, and the distance of the figure in the area become, to thereby have a trapezoidal shape, and the more the contour of the figure in the area is indistinct. In this case, the grayscale pattern becomes the pattern A2, namely the pattern in which the smaller the value of the horizontal coordinate is, the slightly larger (not larger than a predetermined value) the width and the interval of the peaks of the grayscale value (the luminance) become.

Figure 12:
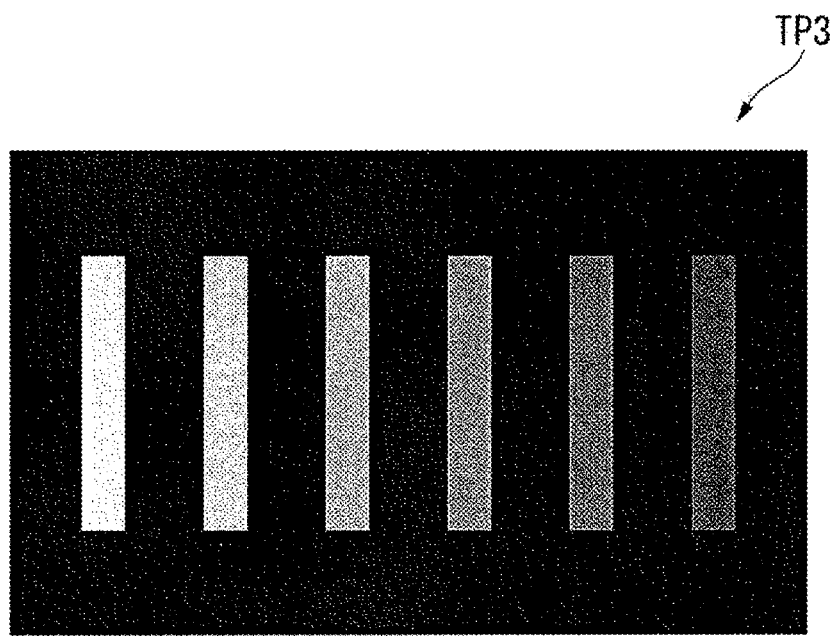
FIG. 12 is a diagram showing an example of the adjusting image selected regarding Case 2 in the first embodiment of the invention.

FIG. 12 shows an example (the adjusting image TP3) of the adjusting image selected with respect to Case 2. The adjusting image TP3 is corrected in the shape of the graphic pattern so that the further the position at which an area of the adjusting image TP3 is projected is located in accordance with the direction in which the adjusting image is projected, the larger the variation in the area is. It should be noted that in the adjusting image TP3, the further the position at which an area of the adjusting image TP3 is projected is located from the projector PJ in the direction in which the adjusting image is projected (the closer to the left end the area is located in FIG. 12), the slightly smaller the width, the height, and the distance of the figure in the area become, and the transformation into the trapezoid is small. Further, in the adjusting image TP3, the further the position at which an area of the adjusting image TP3 is projected is located from the projector PJ in the direction in which the adjusting image is projected (the closer to the left end the area is located in FIG. 12), the higher the grayscale value in the area becomes.

Figure 13:
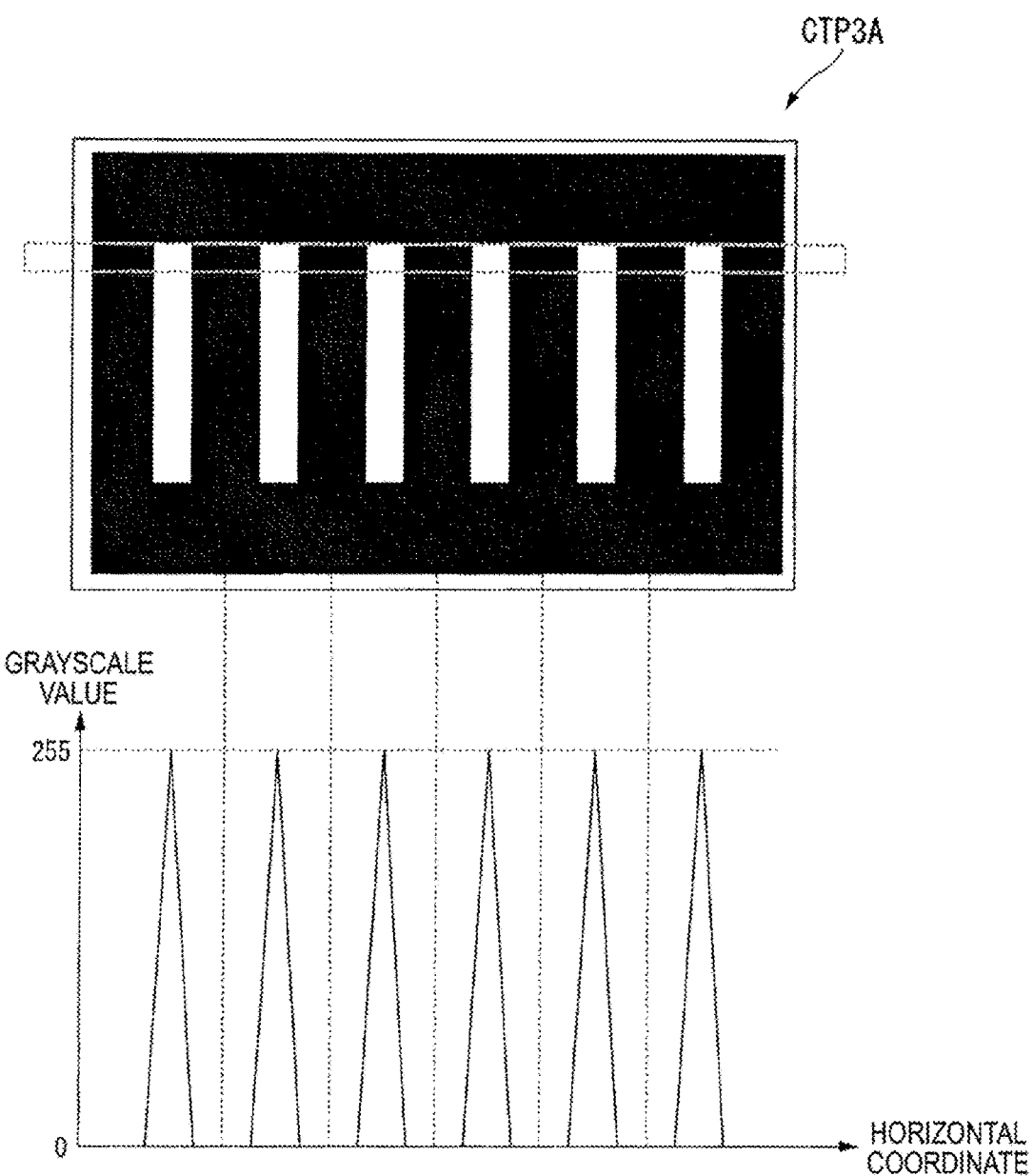
FIG. 13 is a diagram showing an example of the imaging adjusting image and the grayscale pattern regarding Case 2 according to the first embodiment of the invention.

FIG. 13 shows an example (a taken adjusting image CTP3A) of the taken adjusting image and the grayscale pattern (an ideal grayscale pattern) with respect to Case 2. The adjusting image selection section 232C (see FIG. 1) outputs the image data of the adjusting image TP3 as the adjusting image updated based on the correction information derived by the adjusting image acquisition section 232 to the image display processing section 340. Thus, the adjusting image TP3 is projected on the screen SC. The taken adjusting image CTP3A is the taken adjusting image taken by the imaging section 50 on this occasion.

It should be noted that the light intensity of the light source lamp 422 (see FIG. 1) can also be adjusted so that the grayscale value of the rectangular white image of the taken adjusting image CTP3A takes the maximum value of 255 (see the lower part of FIG. 13).

Figure 14:
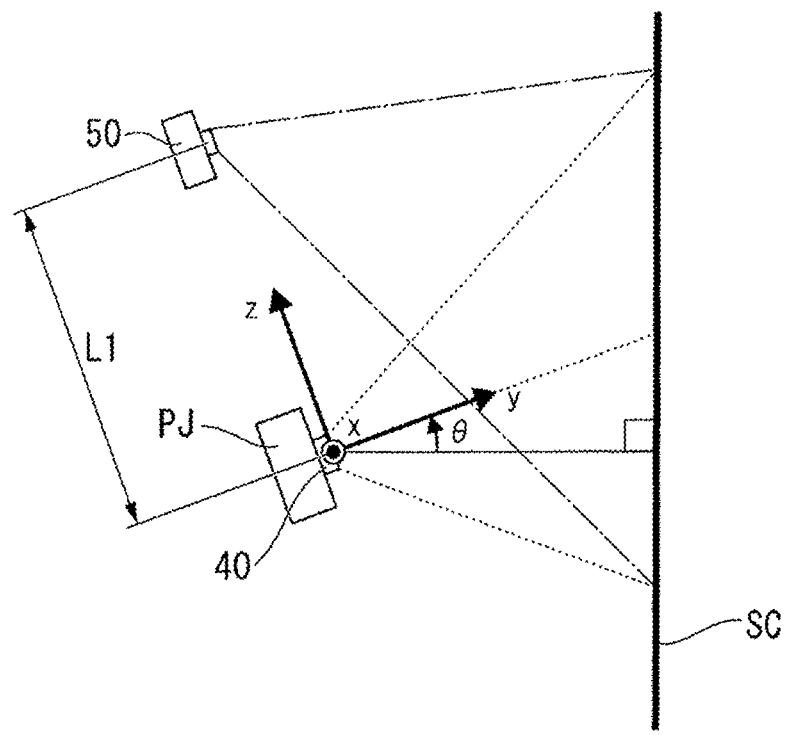
FIG. 14 is a diagram showing a third example (Case 3) of the positional relationship between the image projection optical system, the screen, and the imaging section in the first embodiment of the invention.

FIG. 14 shows a third example (hereinafter referred to as "Case 3") of the positional relationship between the image projection optical system, the screen, and the imaging section. In FIG. 14, the xyz coordinate system is defined taking the image projection optical system 40 of the projector PJ as the origin. Here, the y axis is defined to have a direction toward the front of the projector PJ, and forms a vertical tilt angle θ (e.g., 15 [degrees]) with respect to the normal line of the screen SC. In other words, the projector PJ is disposed so as to have the vertical tilt angle θ with respect to the screen SC. Further, the x axis is defined to have a horizontally rightward direction forming a right angle with the y axis. Further, the z axis is defined to have an upward direction forming a right angle with each of the x axis and the y axis.

In FIG. 14, the imaging section 50 is disposed at a position by a distance L1 distant from the image projection optical system 40 in the positive direction of the z axis, for example. The imaging section 50 detects the information (e.g., the grayscale pattern) regarding the direction in which the adjusting image is projected on the screen SC. Here, the imaging section 50 images the adjusting image TP1 (see FIG. 3) projected on the screen SC, and then detects the information regarding the direction in which the adjusting image is projected on the screen SC based on the shape and the grayscale value (e.g., the luminance) of the graphic pattern of the adjusting image thus imaged.

Figure 15:
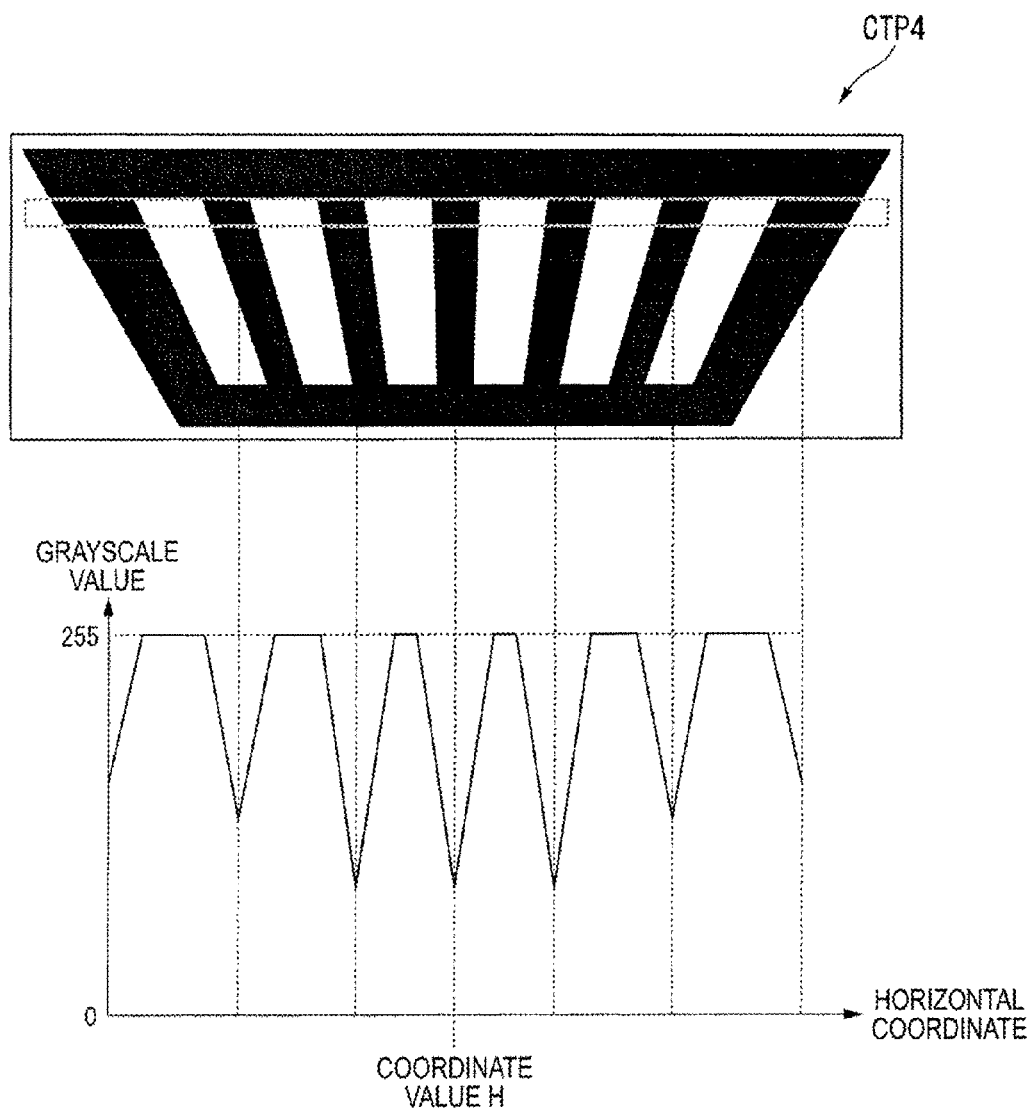
FIG. 15 is a diagram showing an example of the imaging adjusting image and the grayscale pattern regarding Case 3 according to the first embodiment of the invention.

FIG. 15 shows an example (a taken adjusting image CTP4) of the taken adjusting image and the grayscale pattern with respect to Case 3. In the upper part of FIG. 15, there is shown the taken adjusting image CTP4. On the other hand, in the lower part of FIG. 15, there is shown a grayscale pattern corresponding to the graphic pattern of the taken adjusting image CTP4. Since the projector PJ is disposed so as to realize the tilt angle θ, the taken adjusting image CTP4 is transformed so that the further the position at which an area of the adjusting image is projected is located from the projector PJ in the direction in which the adjusting image is projected (the closer to the upper end the area is located in FIG. 15), the larger the width, the height, and the distance of the figure in the area become, to thereby have a trapezoidal shape, and the more the contour of the figure in the area is indistinct. In this case, in the grayscale pattern, the width and the interval of the peaks of the grayscale value (the luminance) increase as the distance from a predetermined horizontal coordinate value H increases.

Figure 16:
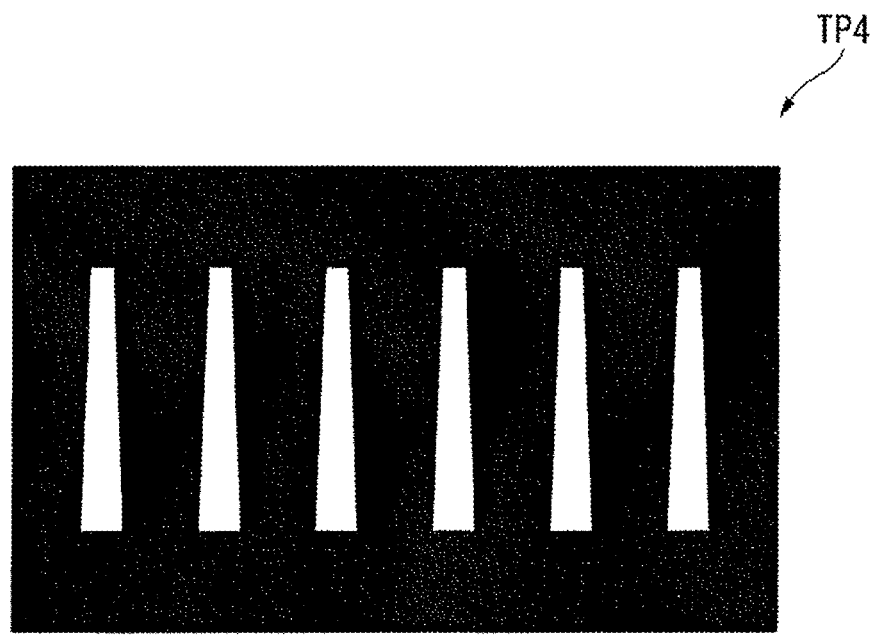
FIG. 16 is a diagram showing an example of the adjusting image selected regarding Case 3 in the first embodiment of the invention.

FIG. 16 shows an example (the adjusting image TP4) of the adjusting image selected with respect to Case 3. The adjusting image TP4 is corrected in the shape of the graphic pattern so that the further the position at which an area of the adjusting image TP4 is projected is located from the projector PJ in accordance with the direction in which the adjusting image is projected, the larger the variation in the area is. Specifically, in the adjusting image TP4, the further the position at which an area of the adjusting image TP4 is projected is located from the projector PJ in the direction in which the adjusting image is projected (the closer to the upper end the area is located in FIG. 16), the smaller the width and the distance of the figure in the area are.

Figure 17:
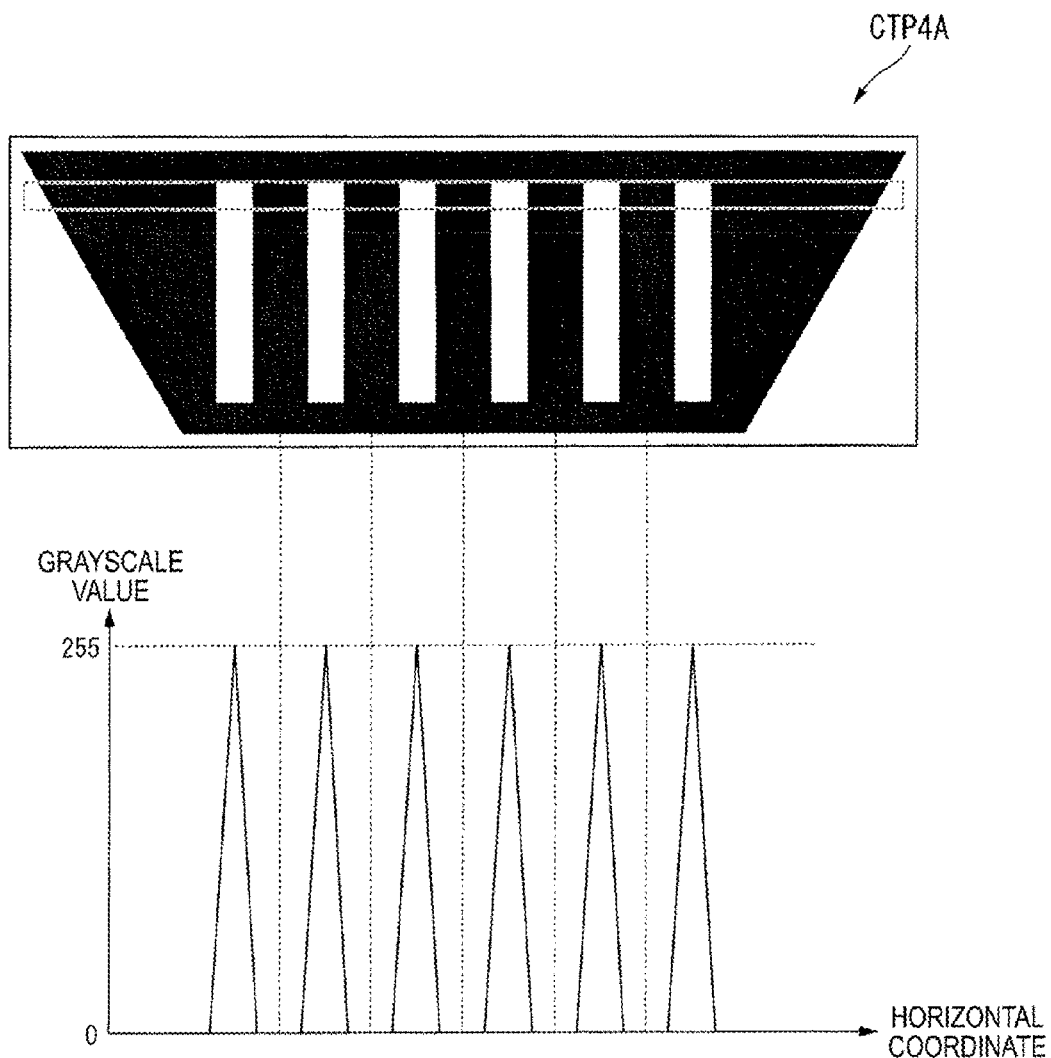
FIG. 17 is a diagram showing an example of the imaging adjusting image and the grayscale pattern regarding Case 3 according to the first embodiment of the invention.

FIG. 17 shows an example (a taken adjusting image CTP4A) of the taken adjusting image and the grayscale pattern (an ideal grayscale pattern) with respect to Case 3. The adjusting image selection section 232C (see FIG. 1) outputs the image data of the adjusting image TP4 as the adjusting image updated based on the correction information derived by the adjusting image acquisition section 232 to the image display processing section 340. Thus, the adjusting image TP4 is projected on the screen SC. The taken adjusting image CTP4A is the taken adjusting image taken by the imaging section 50 on this occasion.

It should be noted that the light intensity of the light source lamp 422 (see FIG. 1) can also be adjusted so that the grayscale value of the rectangular white image of the taken adjusting image CTP4A takes the maximum value of 255 (see the lower part of FIG. 17).

Figure 18:
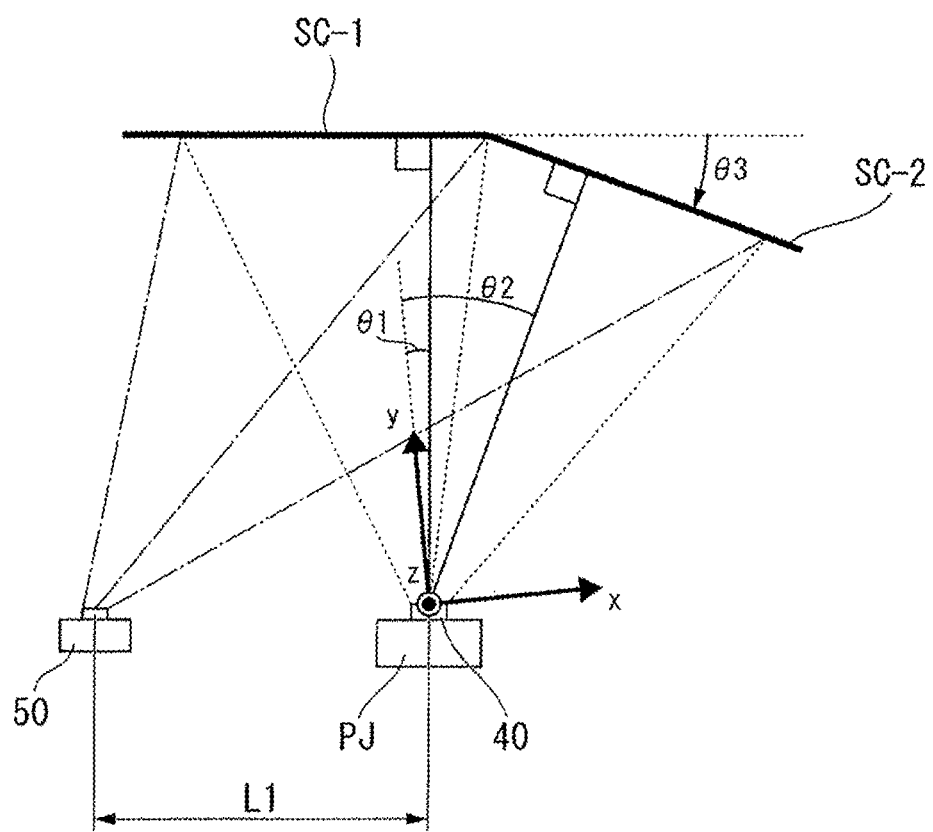
FIG. 18 is a diagram showing a fourth example (Case 4) of the positional relationship between the image projection optical system, the screen, and the imaging section in the first embodiment of the invention.

FIG. 18 shows a fourth example (Case 4) of the positional relationship between the image projection optical system, the screen, and the imaging section. In FIG. 18, the screen. SC is composed of two regions (a screen SC-1 and a screen SC-2). The screen SC-2 is disposed so as to form an angle θ3 with the screen SC-1. In FIG. 18, the xyz coordinate system is defined taking the image projection optical system 40 of the projector PJ as the origin.

Here, the y axis is defined to have a direction toward the front of the projector PJ, and forms a horizontal tilt angle θ1 with respect to the normal line of the screen SC-1. In other words, the projector PJ is disposed so as to have the horizontal tilt angle θ1 with respect to the screen SC-1. Further, the y axis forms the horizontal tilt angle θ2 with respect to the normal line of the screen SC-2. In other words, the projector PJ is disposed so as to have the horizontal tilt angle θ2 with respect to the screen SC-2. Further, the x axis is defined to have a horizontally rightward direction forming a right angle with the y axis. Further, the z axis is defined to have an upward direction forming a right angle with each of the x axis and the y axis.

In FIG. 18, the imaging section 50 is disposed at a position by a distance L1 distant from the image projection optical system 40 in the negative direction of the x axis, for example. Similarly to the case explained with reference to FIG. 5, the imaging section 50 detects the information (e.g., the grayscale pattern) regarding the direction in which the adjusting image is projected on the screen SC-1. Further, similarly to the method explained using FIG. 5, the imaging section 50 detects the information (e.g., the grayscale pattern) regarding the direction in which the adjusting image is projected on the screen SC-2. Specifically, the imaging section 50 detects the information regarding the direction in which the adjusting image is projected for each of the regions of the screen SC in the case in which the screen SC includes a deformation, or the case in which it is unachievable to focus on a specific part on the screen SC due to the performance of the image projection optical system 40.

Figure 19C:
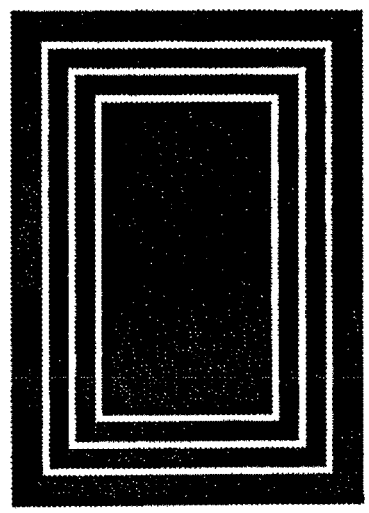
FIGS. 19A through 19C are diagrams showing a variety of examples of the adjusting image in the first embodiment of the invention.
Figure 19B:
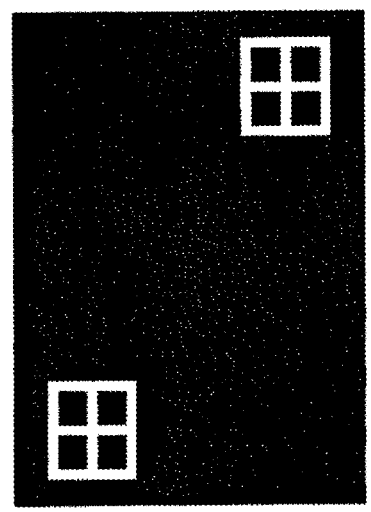
Figure 19A:
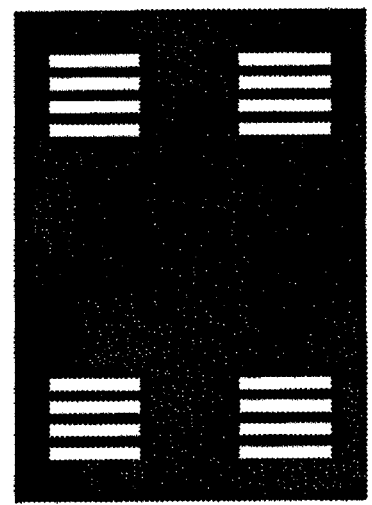

FIGS. 19A through 19C show a variety of examples of the adjusting image. FIG. 19A shows an image having stripe pattern images respectively drawn on the four corners of the black background image Pb as a fifth example of the adjusting image. Further, FIG. 19B shows an image having figures each including a crisscross in a rectangular frame respectively drawn on the upper left corner and the lower right corner of the black background image Pb as a sixth example of the adjusting image. Further, FIG. 19C shows an image having three concentric rectangular frames drawn in the black background image Pb as a seventh example of the adjusting image. It should be noted that the graphic pattern of the adjusting image is not required to be limited to the graphic patterns explained above.

As described above, the image processing device is provided with the imaging section 50 and the image analysis section 236 for detecting the information regarding the direction in which the adjusting image TPn for adjusting the focus of the image to be projected on the projection surface (the screen SC) on the projection surface, and the adjusting image acquisition section 232 for obtaining the different adjusting image TPn in accordance with the information regarding the direction detected by the imaging section 50 and the image analysis section 236.

According to this configuration, the adjusting image acquisition section 232 obtains the different adjusting image TPn in accordance with the information regarding the direction. Thus, it is possible for the image processing device to suppress the influence of the direction in which the image is projected on the projection surface to thereby improve the accuracy of the focus adjustment.

Further, in the image processing device, the adjusting image generation section 232B of the adjusting image acquisition section 232 generates the adjusting image TPn in accordance with the information regarding the direction detected by the imaging section 50 and the image analysis section 236.

According to this configuration, the adjusting image generation section 232B of the adjusting image acquisition section 232 generates the adjusting image TPn in accordance with the information regarding the direction detected by the imaging section 50 and the image analysis section 236. Thus, it is possible for the image processing device to suppress the influence of the direction in which the image is projected on the projection surface to thereby improve the accuracy of the focus adjustment.

Further, the image processing device is provided with the adjusting image information storage section 264 for storing the information regarding the direction and the adjusting image so as to be associated with each other, and the adjusting image selection section 232C of the adjusting image acquisition section 232 selects the adjusting image corresponding to the information regarding the direction detected by the imaging section 50 and the image analysis section 236 out of the adjusting images TPn stored in the adjusting image information storage section 264.

According to this configuration, the adjusting image selection section 232C of the adjusting image acquisition section 232 selects the adjusting image corresponding to the information regarding the direction in which the image is projected on the projection surface out of the adjusting images TPn stored in the adjusting image information storage section 264. Thus, it is possible for the image processing device to suppress the influence of the direction in which the image is projected on the projection surface to thereby improve the accuracy of the focus adjustment.

The projector PJ is provided with the image projection optical system 40 for projecting the adjusting image for adjusting the focus of the image projected on the projection surface (the screen SC) and the image processing device described above.

Thus, it is possible for the projector PJ to suppress the influence of the direction in which the image is projected on the projection surface to thereby improve the accuracy of the focus adjustment.

Further, the projector PJ makes the adjusting image TPn, which is used for adjusting the focus of the image to be projected on the projection surface, different in accordance with the direction in which the adjusting image TPn is projected on the projection surface.

Thus, it is possible for the projector PJ to suppress the influence of the direction in which the image is projected on the projection surface to thereby improve the accuracy of the focus adjustment.

Second Embodiment

The second embodiment is different from the first embodiment in the point that the tilt angle of the projector PJ is detected based on the position of a bright point projected from the laser emission device on the screen SC. Hereinafter, only the difference from the first embodiment will be explained.

Figure 20:
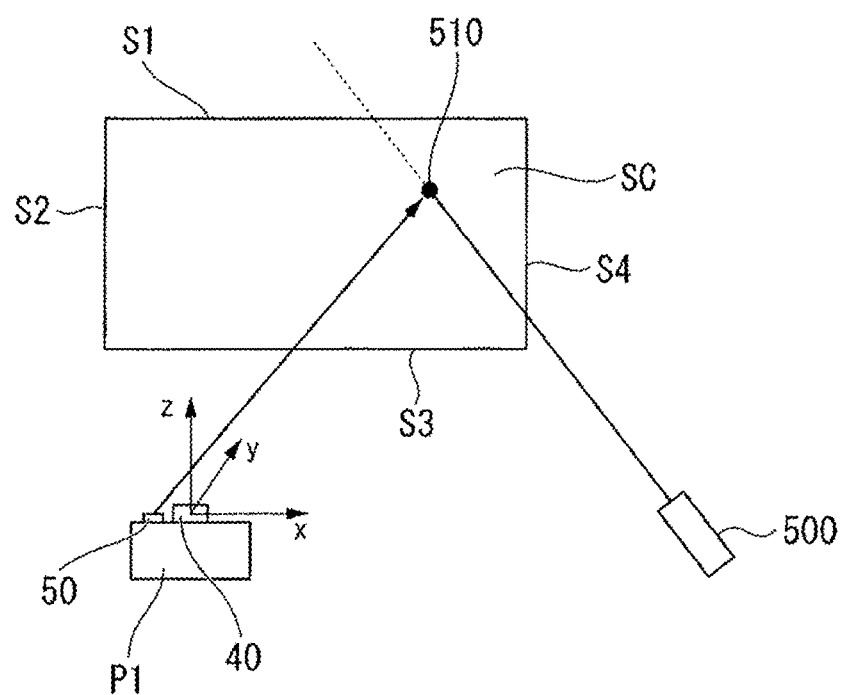
FIG. 20 is a diagram for explaining a method of detecting the tilt of the screen with respect to the projector in a second embodiment of the invention.

FIG. 20 shows a diagram for explaining a method of detecting the tilt of the screen with respect to the projector. In FIG. 20, the laser beam is projected from the laser emission device 500 on the screen SC to thereby project the bright point 510 due to the laser beam on the screen SC. The imaging section 50 images the bright point 510 projected on the screen SC a plurality of times, and then detects the information regarding the direction in which the adjusting image is projected on the screen SC based on the movement of the bright point 510 thus imaged.

Further, the image analysis section 236 performs the analysis of the taken image. In the case in which the bright point 510 moves rightward (in the positive direction of the x axis) on the screen SC, the image analysis section 236 determines that the screen SC comes closer to the projector PJ without tilting in either the horizontal direction or the vertical direction. Further, the image analysis section 236 can also determine that the screen SC tilts while a side S4 of the screen SC comes closer to the projector PJ, and at the same time, a side S2 of the screen SC keeps the relative distance from the projector PJ. Further, the image analysis section 236 can also determine that the screen SC tilts while a side S1 of the screen SC comes closer to the projector PJ, and at the same time, a side S3 of the screen SC keeps the relative distance from the projector PJ. It should be noted that in the case in which the bright point 510 moves rightward on the screen SC as much as a distance shorter than a predetermined threshold value, the image analysis section 236 can also determine that the screen SC tilts while the side S2 of the screen SC comes closer to the projector PJ, and at the same time, the side S4 of the screen SC keeps the relative distance from the projector PJ.

On the other hand, in the case in which the bright point 510 moves leftward (in the negative direction of the x axis) on the screen SC, the image analysis section 236 determines that the screen SC moves away from the projector PJ without tilting in either the horizontal direction or the vertical direction. Further, the image analysis section 236 can also determine that the screen SC tilts while the side S1 of the screen SC moves away from the projector PJ, and at the same time, the side S3 of the screen SC keeps the relative distance from the projector PJ.

The image analysis section 236 performs the comparison with the moving pattern of the bright point 510 measured in advance to thereby distinguish the movement of the bright point 510. Thus, the image analysis section 236 can accurately detect the tilt direction of the projector PJ.

As described above, the imaging section 50 images the bright point 510 projected on the projection surface (the screen SC). The image analysis section 236 detects the information regarding the direction in which the adjusting image TPn is projected on the projection surface based on the movement of the bright point thus imaged.

Thus, it is possible for the image processing device to reliably suppress the influence of the direction in which the image is projected on the projection surface based on the bright point 510 projected on the projection surface (the screen SC) to thereby improve the accuracy of the focus adjustment.

Although the embodiments of the invention are hereinabove described in detail with reference to the accompanying drawings, the specific configuration is not limited to the embodiments described above, but the design and so on within the scope or the spirit of the invention are also included therein.

For example, the image processing device can also switch the adjusting image TPn during the focus adjustment process even in the case in which the projector PJ is opposed straight to the screen SC. Thus, the image processing device can improve the time required for the focus adjustment in some cases.

Further, for example, it is also possible for the image processing device to execute the focus adjustment process by projecting the adjusting images TPn for the respective colors while switching between the adjusting images TPn. Thus, the image processing device can more reliably adjust the focus compared to the case of switching the monochrome adjusting images TPn.

Further, for example, in the case in which the projector PJ has the horizontal and vertical tilt direction with respect to the screen SC, it is possible for the image processing device to first adjust the focus while switching the adjusting images TPn as described above with respect to the pitch rotation (the tilt rotation: around the x axis), and then adjust the focus while switching the adjusting images TPn with respect to the yaw rotation (the pan rotation: around the z axis).

Further, for example, the adjusting image acquisition section 232 can obtain the adjusting image in accordance with whether or not the imaging section 50 is incorporated in the housing of the projector PJ (whether or not the distance L1 or L2 from the image projection optical system 40 to the imaging section 50 is shorter than a predetermined distance). For example, in the case in which the imaging section 50 is incorporated in the housing of the projector PJ, the adjusting image selection section 232C selects the adjusting image including the graphic pattern having a rectangular shape. In contrast, in the case in which the imaging section 50 is not incorporated in the housing of the projector PJ (the imaging section 50 is externally located), the adjusting image selection section 232C selects the adjusting image including the graphic pattern having a trapezoidal shape.

Further, for example, the information representing the tilt angle θ of the projector PJ can be input to the control section 220 via the input operation section 10. The tilt angle θ of the projector PJ can be detected by the motion detection section 60.

It should be noted that it is also possible to arrange that the program for realizing the image processing device and the projector explained hereinabove is recorded on a computer readable recording medium, and then the program is read and then executed by the computer system. It should be noted that the "computer system" mentioned here should include an OS and the hardware such as the peripheral devices. Further, the "computer-readable recording medium" denotes a portable recording medium such as a flexible disk, a magneto-optical disk, a ROM, and a CD-ROM, and a storage device such as a hard disk incorporated in the computer system. Further, the "computer-readable recording medium" should include those holding a program for a certain period of time such as a volatile memory (a RAM) in a computer system to be a server or a client in the case of transmitting the program via a network such as the Internet, or a communication line such as a telephone line. Further, the program described above can be transmitted from the computer system having the program stored in the storage device or the like to another computer system via a transmission medium or using a transmission wave in the transmission medium. Here, the "transmission medium" for transmitting the program denotes a medium having a function of transmitting information such as a network (a communication network) such as the Internet or a communication line (a communication wire) such as a telephone line. Further, the program described above can be for realizing a part of the function described above. Further, the program described above can be a program, which can realize the function described above in combination with a program recorded on the computer system in advance, namely a so-called differential file (a differential program).

What is claimed is:

1. An image processing device comprising:
    an adjusting image information storage section adapted to store adjusting images in association with information regarding a direction in which each adjusting image is projected on a projection surface, such that a different adjusting image is stored in association with information regarding a different direction, respectively, the adjusting images being used for adjusting focus of an image to be projected on the projection surface;
    a detection section adapted to detect information regarding the direction in which the adjusting image is projected on the projection surface; and
    an adjusting image acquisition section adapted to obtain the adjusting image from among the adjusting images stored in the adjusting image information storage section in accordance with the information regarding the direction detected by the detection section,
    wherein each of the adjusting images stored in the adjusting image information storage section has a shape of a graphic pattern corrected such that the further a position at which an area of the adjusting image is projected is located from the projector, with respect to the direction in which the adjusting image is projected, the larger a variation in the area of the adjusting image.

2. The image processing device according to claim 1, wherein
    the adjusting image acquisition section generates the adjusting image in accordance with the information regarding the direction detected by the detection section.

3. The image processing device according to claim 1, wherein the adjusting image acquisition section selects the adjusting image corresponding to the information regarding the direction detected by the detection section out of the adjusting images stored in the adjusting image information storage section.

4. The image processing device according to claim 1, wherein
    the detection section images the adjusting image projected on the projection surface, and then detects the information regarding the direction based on at least one of a shape and a grayscale value of a graphic pattern of the adjusting image thus imaged.

5. The image processing device according to claim 1, wherein
    the detection section images a bright point projected on the projection surface, and then detects the information regarding the direction based on movement of the bright point thus imaged.

6. The image processing device according to claim 3, wherein
    the adjusting image information storage section stores the adjusting images each having a grayscale value of a graphic pattern corrected in association with the information regarding the direction so that the further a position at which an area of the adjusting image is projected is located in the direction in which the adjusting image is projected, the larger a variation in the area is.

7. A projector comprising:
    an image projection optical system adapted to project an image on a projection surface; and
    the image processing device according to claim 1.

8. A projector comprising:
    an image projection optical system adapted to project an image on a projection surface; and
    the image processing device according to claim 2.

9. A projector comprising:
    an image projection optical system adapted to project an image on a projection surface; and
    the image processing device according to claim 3.

10. A projector comprising:
an image projection optical system adapted to project an image on a projection surface; and
the image processing device according to claim 4.

11. A projector comprising:
an image projection optical system adapted to project an image on a projection surface; and
the image processing device according to claim 5.

12. A projector comprising:
an image projection optical system adapted to project an image on a projection surface; and
the image processing device according to claim 6.

13. A projector comprising:
an image projection optical system adapted to project an image on a projection surface; and
an image processing device adapted to:
  store adjusting images in association with information regarding a direction in which each adjusting image is projected on a projection surface, such that a different adjusting image is stored in association with information regarding a different direction, respectively, the adjusting images being used for adjusting focus of an image to be projected on the projection surface;
  vary the adjusting image in accordance with the direction in which the adjusting image is projected on the projection surface,
wherein each of the adjusting images stored in the adjusting image information storage section has a shape of a graphic pattern corrected such that the further a position at which an area of the adjusting image is projected is located from the projector, with respect to the direction in which the adjusting image is projected, the larger a variation in the area of the adjusting image.

14. An image processing method comprising:
storing, by an adjusting image information storage section, adjusting images in association with information regarding a direction in which each adjusting image is projected on a projection surface, such that a different adjusting image is stored in association with information regarding a different direction, respectively, the adjusting images being used for adjusting focus of an image to be projected on the projection surface;
detecting, by a detection section, information regarding the direction in which the adjusting image is projected on the projection surface;
obtaining, by an adjusting image acquisition section, the adjusting image from among the adjusting images stored in the adjusting image information storage section in accordance with the information regarding the direction detected by the detection section, and
wherein each of the adjusting images stored in the adjusting image information storage section has a shape of a graphic pattern corrected such that the further a position at which an area of the adjusting image is projected is located from the projector, with respect to the direction in which the adjusting image is projected, the larger a variation in the area of the adjusting image.

\* \* \* \* \*